United States Patent
Shimada

(10) Patent No.: US 10,222,482 B2
(45) Date of Patent: Mar. 5, 2019

(54) POSITION INFORMATION GENERATION DEVICE, TIMING SIGNAL GENERATION DEVICE, ELECTRONIC APPARATUS, AND MOVING OBJECT

(71) Applicant: Seiko Epson Corporation, Tokyo (JP)

(72) Inventor: Hiroyuki Shimada, Suwa (JP)

(73) Assignee: Seiko Epson Corporation (JP)

( * ) Notice: Subject to any disclaimer, the term of this patent is extended or adjusted under 35 U.S.C. 154(b) by 647 days.

(21) Appl. No.: 14/660,129

(22) Filed: Mar. 17, 2015

(65) Prior Publication Data
US 2015/0185329 A1     Jul. 2, 2015

Related U.S. Application Data

(63) Continuation-in-part of application No. 14/153,463, filed on Jan. 13, 2014, now Pat. No. 9,952,562.

(30) Foreign Application Priority Data

Jan. 18, 2013  (JP) ................................. 2013-006994
Mar. 18, 2014  (JP) ................................. 2014-054798

(51) Int. Cl.
| | |
|---|---|
| *G01S 19/13* | (2010.01) |
| *G01S 19/42* | (2010.01) |
| *G01S 19/40* | (2010.01) |
| *G01S 19/39* | (2010.01) |
| *G04F 5/14* | (2006.01) |

(52) U.S. Cl.
CPC .............. *G01S 19/42* (2013.01); *G01S 19/39* (2013.01); *G01S 19/40* (2013.01); *G01S 19/13* (2013.01); *G04F 5/14* (2013.01); *G04F 5/145* (2013.01)

(58) Field of Classification Search
CPC .......... G01C 17/00–17/38; G01S 19/42; G01S 19/40; G01S 19/13; G01S 19/09; G01S 19/24
USPC ............ 342/357.51, 357.23, 357.25, 357.46, 342/357.63
See application file for complete search history.

(56) References Cited

U.S. PATENT DOCUMENTS

| | | | |
|---|---|---|---|
| 4,468,793 A | 8/1984 | Johnson et al. | |
| 4,797,677 A * | 1/1989 | MacDoran | .............. G01S 11/10 342/352 |

(Continued)

FOREIGN PATENT DOCUMENTS

| | | |
|---|---|---|
| CN | 102253379 A | 11/2011 |
| JP | 08-313613 | 11/1996 |

(Continued)

*Primary Examiner* — Chuong P Nguyen
(74) *Attorney, Agent, or Firm* — Harness, Dickey & Pierce, P.L.C.

(57) ABSTRACT

A timing signal generation device includes a GPS receiver that performs a positioning calculation based on a satellite signal; and a digital signal processor that generates position information regarding a reception point based on a value present within a range of A±σ/4 wherein A is a most frequent value or a median value of a plurality of positioning calculation results of the GPS receiver and σ is a standard deviation of the plurality of positioning calculation results. A timing signal is generated based on the satellite signal from at least one position information satellite and the position information regarding the reception point.

11 Claims, 15 Drawing Sheets

(56) References Cited

U.S. PATENT DOCUMENTS

| | | | | |
|---|---|---|---|---|
| 4,894,662 | A * | 1/1990 | Counselman | G01C 15/00 342/357.25 |
| 5,317,514 | A * | 5/1994 | Bancroft | G01S 19/20 342/357.44 |
| 5,323,163 | A | 6/1994 | Maki | |
| 5,412,389 | A | 5/1995 | Olds | |
| 5,517,430 | A * | 5/1996 | Lewis | G01C 17/26 33/363 K |
| 5,631,838 | A | 5/1997 | Ishikawa et al. | |
| 5,798,733 | A | 8/1998 | Ethridge | |
| 5,808,581 | A | 9/1998 | Braisted et al. | |
| 6,061,018 | A | 5/2000 | Sheynblat | |
| 6,114,988 | A | 9/2000 | Schipper et al. | |
| 6,535,833 | B1 * | 3/2003 | Syrjarinne | G01S 19/39 342/357.29 |
| 6,633,255 | B2 * | 10/2003 | Krasner | G01S 5/0027 342/357.63 |
| 6,799,116 | B2 * | 9/2004 | Robbins | G01S 5/009 340/991 |
| 7,881,407 | B2 * | 2/2011 | Chansarkar | G01S 19/22 342/357.2 |
| 8,046,169 | B2 * | 10/2011 | Mazlum | G01S 19/50 180/170 |
| 8,350,756 | B2 * | 1/2013 | Thomson | G01S 19/09 342/357.43 |
| 8,358,241 | B2 * | 1/2013 | Yoshioka | G01S 19/42 342/357.23 |
| 9,074,897 | B2 * | 7/2015 | Kulik | G01C 21/165 |
| 9,389,317 | B2 * | 7/2016 | Zhang | G01S 19/42 |
| 9,494,693 | B2 * | 11/2016 | Hernandez-Pajares | G01S 19/44 |
| 9,952,562 | B2 * | 4/2018 | Shimada | G04R 40/02 |
| 2004/0203861 | A1 | 10/2004 | Sahinoglu | |
| 2005/0093739 | A1 | 5/2005 | DiLellio | |
| 2005/0168382 | A1 * | 8/2005 | Awata | G01S 19/29 342/357.68 |
| 2006/0052115 | A1 | 3/2006 | Khushu | |
| 2006/0082495 | A1 | 4/2006 | Wakamatsu et al. | |
| 2008/0191935 | A1 | 8/2008 | Tidwell | |
| 2008/0273578 | A1 | 11/2008 | Brenner et al. | |
| 2009/0002228 | A1 | 1/2009 | Wang | |
| 2009/0091495 | A1 | 4/2009 | Meyers et al. | |
| 2010/0079333 | A1 | 4/2010 | Janky et al. | |
| 2010/0217517 | A1 | 8/2010 | Oohashi et al. | |
| 2011/0195339 | A1 | 8/2011 | Iijima et al. | |
| 2011/0309864 | A1 * | 12/2011 | Yensen | G04G 3/04 327/151 |
| 2012/0286880 | A1 | 11/2012 | Kowada | |
| 2014/0009332 | A1 | 1/2014 | Morrison et al. | |
| 2016/0274243 | A1 * | 9/2016 | Maki | G01S 19/14 |
| 2016/0352344 | A1 * | 12/2016 | Maki | H03L 7/26 |

FOREIGN PATENT DOCUMENTS

| | | |
|---|---|---|
| JP | 09-178870 | 7/1997 |
| JP | 2000-314771 A | 11/2000 |
| JP | 2003-149316 A | 5/2003 |
| JP | 2003-344526 A | 12/2003 |
| JP | 2004-163404 A | 6/2004 |
| JP | 2006-010638 A | 1/2006 |
| JP | 2006-112878 A | 4/2006 |
| JP | 2007-114119 A | 5/2007 |
| JP | 2007-114120 A | 5/2007 |
| JP | 2008-107353 A | 5/2008 |
| JP | 2009-008556 A | 1/2009 |
| JP | 2009-222486 A | 10/2009 |
| JP | 2010-088071 A | 4/2010 |
| JP | 2010-139439 A | 6/2010 |
| JP | 2010-197280 A | 9/2010 |
| JP | 2011-080898 A | 4/2011 |
| JP | 2013-036985 A | 2/2013 |
| WO | WO-2011-086976 A1 | 7/2011 |

* cited by examiner

MAIN FRAME STRUCTURE

TLM (Telmetry) WORD STRUCTURE

HOW (Hand Over) WORD STRUCTURE

|  | LATITUDE (ddmmss.sss) | LONGITUDE (ddmmss.sss) | STANDARD HEIGHT (ALTITUDE) (m) | DISTANCE WITH TRUE POSITION (m) |
|---|---|---|---|---|
| AVERAGE VALUE | 361032.04 | 1375744.28 | 689.886 | 7.62 |
| MEDIAN VALUE | 361032.12 | 1375744.17 | 687.380 | 3.84 |
| MOST FRE-QUENT VALUE | 361032.13 | 1375744.17 | 686.955 | 2.98 |
| TRUE POSITION | 361032.10 | 1375744.10 | 684.020 | 0 |

FIG. 7A

|  | LATITUDE (ddmmss.sss) | LONGITUDE (ddmmss.sss) | STANDARD HEIGHT (ALTITUDE) (m) | DISTANCE WITH TRUE POSITION (m) |
|---|---|---|---|---|
| AVERAGE VALUE | 361032.06 | 1375744.68 | 737.70 | 55.60 |
| MEDIAN VALUE | 361032.09 | 1375744.28 | 711.45 | 27.80 |
| MOST FRE-QUENT VALUE | 361032.15 | 1375744.13 | 690.47 | 6.68 |
| TRUE POSITION | 361032.10 | 1375744.10 | 684.02 | 0 |

FIG. 7B

| | LATITUDE (ddmmss.sss) | LONGITUDE (ddmmss.sss) | ALTITUDE (m) | DISTANCE WITH TRUE POSITION (m) | TIMING ERROR (ns) |
|---|---|---|---|---|---|
| AVERAGE VALUE | 361032.06 | 1375744.68 | 737.7 | 55.6 | 183.48 |
| MEDIAN VALUE − σ/4 | 361031.73 | 1375744.05 | 692.55 | 14.229 | 46.9557 |
| MEDIAN VALUE | 361032.09 | 1375744.28 | 711.45 | 27.8 | 91.74 |
| MEDIAN VALUE + σ/4 | 361032.45 | 1375744.51 | 730.35 | 48.694 | 160.6902 |
| MOST FREQUENT VALUE −σ/4 | 361031.79 | 1375743.9 | 671.58 | 16.474 | 54.3642 |
| MOST FREQUENT VALUE | 361032.15 | 1375744.13 | 690.47 | 6.68 | 22.044 |
| MOST FREQUENT VALUE +σ/4 | 361032.51 | 1375744.36 | 709.37 | 29.09 | 95.997 |
| TRUE POSITION | 361032.1 | 1375744.1 | 684.02 | 0 | 0 |

FIG. 8

POSITION INFORMATION GENERATION DEVICE, TIMING SIGNAL GENERATION DEVICE, ELECTRONIC APPARATUS, AND MOVING OBJECT

BACKGROUND

1. Technical Field

The present invention relates to a position information generation device, a timing signal generation device, an electronic apparatus, and a moving object.

2. Related Art

A Global Positioning System (GPS) using satellites is a widely used type of the Global Navigation Satellite Systems (GNSSs). Atomic clocks with considerably high accuracy are mounted on the GPS satellites used in the GPS, and thus the GPS satellites transmit satellite signals by which accurate time information or orbit information regarding the GPS satellites is transmitted to the ground. The satellite signals transmitted from the GPS satellites are received by GPS receivers. Then, the GPS receivers perform a process of calculating time information or the current positions of the GPS receivers, a process of generating an accurate timing signal (1 Pulse Per Second (PPS)) synchronized with a coordinated universal time (UTC), or the like based on the time information or the orbit information superimposed on the satellite signals.

Such GPS receivers are generally provided with a normal positioning (position estimating) mode in which a position and a time are supplied based on a positioning calculation and a fixed position mode in which a time is supplied through fixed position positioning at a known position.

In the normal positioning mode, satellite signals from a number of GPS satellites equal to or greater than a predetermined number (a minimum of three GPS satellites in the case of 2-dimensial positioning and four GPS satellites in the case of 3-dimensional positioning) are necessary. As the number of GPS satellites capable of receiving satellite signals becomes larger, the accuracy of the positioning calculation is improved.

In the fixed position mode, on the other hand, when the position information regarding the GPS receiver is set and when a satellite signal can be received from at least one GPS satellite, the 1 PPS can be generated.

Since the accuracy of the 1 PPS in the fixed position mode depends on the accuracy of the set position information, it is important to set accurate position information in the GPS receiver. As methods of acquiring the accurate position information set in the GPS receiver, for example, a method of reading position information from a map or a method of measuring position information can be considered. However, in the former case, it is difficult to acquire the position information depending on a reception location. In the latter case, there is a problem of cost such as expense or time.

In order to resolve such problems, JP-A-9-178870 suggests a method of performing positioning calculation with an installed GPS receiver, averaging position information regarding positioning results for a predetermined time, and determining the position of a reception point. According to this method, the position information can be acquired at any reception location and cost can also be reduced.

However, when a certain error such as multi-paths occurs, the position information regarding the result of the position calculation includes a large error. In the method of averaging the positioning calculation results in JP-A-9-178870, there is a probability that an error of the position of a reception point obtained as the result of the averaging may increase. For this reason, in the method of JP-A-9-178870, there is a problem that the accuracy of 1 PPS (timing signal) may deteriorate depending on a reception environment at the time of performing the positioning calculation. Such a problem is also common to GPS receivers and reception devices of the other Global Navigation Satellite Systems (GNSSs).

SUMMARY

An advantage of some aspects of the invention is that it provides a position information generation device and a timing signal generation device capable of generating a more accurate timing signal than the related art and is rarely influenced by a positioning result having a large error even when the error of the positioning calculation increases due to deterioration in a reception environment and provides an electronic apparatus and a moving object including the timing signal generation device and having high reliability.

The invention can be implemented as the following forms or application examples.

Application Example 1

This application example of the invention is directed to a position information generation device including: a positioning calculation unit that performs positioning calculation based on a satellite signal; and a position information generation unit that generates position information regarding a reception point based on a value present within a range of $A\pm\sigma/4$ on the assumption that A is a most frequent value or a median value of a plurality of positioning calculation results of the positioning calculation unit and $\sigma$ is a standard deviation of the plurality of positioning calculation results.

The position information generation device generates the position information regarding the reception point based on the value present in the range of $A\pm\sigma/4$. Therefore, it is possible to generate the timing signal which is rarely influenced by positioning results having a large error, as in irregular data such as multi-paths, and which is more accurate than in the related art in which the average value of the plurality of positioning calculation results is used to generate the position information regarding the reception point, even when the error of the positioning calculation increases due to deterioration in a reception environment.

Application Example 2

This application example of the invention is directed to a timing signal generation device including: a positioning calculation unit that performs positioning calculation based on a satellite signal; a position information generation unit that generates position information regarding a reception point based on a value present within a range of $A\pm\sigma/4$ on the assumption that A is a most frequent value or a median value of a plurality of positioning calculation results of the positioning calculation unit and $\sigma$ is a standard deviation of the plurality of positioning calculation results; and a timing signal generation unit that generates a timing signal based on the satellite signal from at least one position information satellite and the position information regarding the reception point.

The timing signal generation device generates the position information regarding the reception point based on the value present in the range of $A\pm\sigma/4$. Therefore, it is possible to generate the timing signal which is rarely influenced by positioning results having a large error, as in irregular data such as multi-paths, and which is more accurate than that in the related art in which the average value of the plurality of positioning calculation results is used to generate the position information regarding the reception point, even when the error of the positioning calculation increases due to deterioration in a reception environment.

Application Example 3

In the timing signal generation device according to the application example of the invention, it is preferable that the timing signal generation device further includes a selection unit that selects the value used for the position information generation unit to generate the position information regarding the reception point within the range.

With this configuration, the position information generation unit can generate the position information regarding the reception point using the value present within a range of $A\pm\sigma/4$.

Application Example 4

In the timing signal generation device according to the application example of the invention, it is preferable that, on the assumption that k is a coefficient, the selection unit selects a value which is the closest to k×A within the range of $A\pm\sigma/4$.

With this configuration, the position information generation unit can generate the position information regarding the reception point using the value present within a range of $A\pm\sigma/4$ in a relatively simple manner.

Application Example 5

In the timing signal generation device according to the application example of the invention, it is preferable that, on the assumption that B is an intermediate value between the most frequent value and the median value and k is a coefficient, the selection unit selects a value which is the closest to k×B within the range of $A\pm\sigma/4$.

With this configuration, the position information generation unit can generate the position information regarding the reception point using the value present within a range of $A\pm\sigma/4$ in a relatively simple manner.

Application Example 6

In the timing signal generation device according to the application example of the invention, it is preferable that the selection unit is able to adjust the coefficient k.

With this configuration, the value used for the position information generation unit to generate the position information regarding the reception point can be selected according to a reception environment.

Application Example 7

In the timing signal generation device according to the application example of the invention, it is preferable that the selection unit adjusts the coefficient k based on at least two values among the most frequent value, the median value, and an average value of the plurality of positioning calculation results of the positioning calculation unit.

With this configuration, the value used for the position information generation unit to generate the position information regarding the reception point can be selected automatically using the positioning calculation results according to the reception environment.

Application Example 8

In the timing signal generation device according to the application example of the invention, it is preferable that the coefficient k is present within a range equal to or greater than 0.7 and equal to or less than 1.3.

With this configuration, k×A or k×B can be prevented from being out of the range of $A\pm\sigma/4$. Therefore, the value used for the position information generation unit to generate the position information regarding the reception point can be selected with high accuracy according to the reception environment.

Application Example 9

In the timing signal generation device according to the application example of the invention, it is preferable that the satellite signal used for the timing signal generation unit to generate the timing signal includes orbit information and time information.

With this configuration, it is possible to generate the timing signal accurately synchronized with the criterion time.

Application Example 10

In the timing signal generation device according to the application example of the invention, it is preferable that the timing signal generation device further includes: an oscillator that outputs a clock signal; and a synchronization control unit that synchronizes the clock signal with the timing signal.

With this configuration, by synchronizing the clock signal output by the oscillator with the accurate timing signal, it is possible to generate the clock signal with higher accuracy than the oscillator.

Application Example 11

In the timing signal generation device according to the application example of the invention, it is preferable that the oscillator is a crystal oscillator.

The crystal oscillator has a small size and consumes low power. Accordingly, by using the crystal oscillator as the oscillator synchronized with the timing signal, it is possible to realize miniaturization and low power consumption of the timing signal generation device. By using a controlled crystal oscillator, it is possible to generate a highly accurate timing signal even when a satellite signal is preferably not received for a long time.

Application Example 12

In the timing signal generation device according to the application example of the invention, it is preferable that the oscillator is an atomic oscillator.

The atomic oscillator has high long-term frequency stability. Accordingly, using the atomic oscillator as the oscillator synchronizing with the timing signal, it is possible to generate a highly accurate timing signal even when a satellite signal is preferably not received for a long time.

Application Example 13

In the timing signal generation device according to the application example of the invention, it is preferable that the timing signal generation device further includes a battery.

With this configuration, by supplying power from the battery, it is possible to drive each unit of the timing signal generation device. Therefore, even in a location where there is no external power source, the timing signal generation device can be installed.

Application Example 14

This application example of the invention is directed to an electronic apparatus including the timing signal generation device according to application example of the invention.

With this configuration, it is possible to provide the electronic apparatus with high reliability.

Application Example 15

This application example of the invention is directed to a moving object including the timing signal generation device according to the application example of the invention.

With this configuration, it is possible to provide the moving object with high reliability.

BRIEF DESCRIPTION OF THE DRAWINGS

Embodiments of the invention will be described with reference to the accompanying drawings, wherein like numbers reference like elements.

FIG. 7A is a table illustrating a positioning calculation result when the number of captures of the GPS satellites is large but reception intensity is low.

FIG. 7B is a table illustrating a positioning calculation result when the number of captures of the GPS satellites is small and the reception intensity is low.

FIG. 8 is a table for describing a relation between an average value and a standard deviation of a median value and a most frequent value of positioning calculation results in the case illustrated in FIG. 7B.

DESCRIPTION OF EXEMPLARY EMBODIMENTS

Hereinafter, a position information generation device, a timing signal generation device, an electronic apparatus, and a moving object according to the invention will be described in detail according to embodiments with reference to the appended drawings.

1. Timing Signal Generation Device (Position Information Generation Device)

First Embodiment

Figure 1:
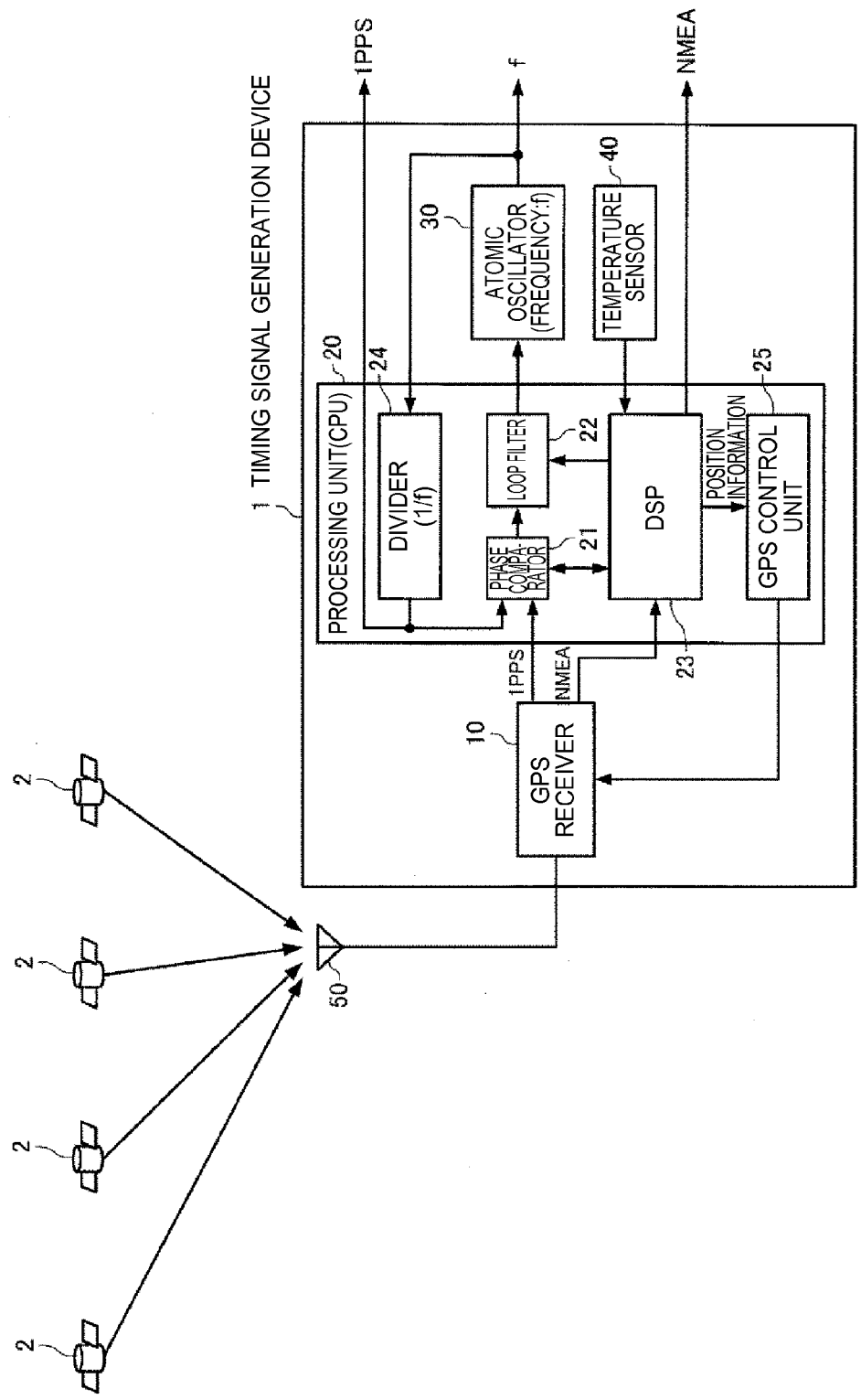
FIG. 1 is a diagram illustrating the overall configuration of a timing signal generation device according to a first embodiment of the invention.

FIG. 1 is a diagram illustrating the overall configuration of a timing signal generation device according to a first embodiment of the invention.

A timing signal generation device 1 illustrated in FIG. 1 is configured to include a GPS receiver 10, a processing unit (CPU) 20, an atomic oscillator 30, a temperature sensor 40, and a GPS antenna 50.

In the timing signal generation device 1, some or all of the constituent elements may be integrated or may be separated physically. For example, the GPS receiver 10 and the processing unit (CPU) 20 may be realized by separate ICs. Alternatively, the GPS receiver 10 and the processing unit (CPU) 20 may be realized as an IC of one chip.

The timing signal generation device 1 receives signals transmitted from GPS satellites 2 (examples of position information satellites) and generates 1 PPS with high accuracy.

The GPS satellites 2 orbit along predetermined orbiting paths above the earth and transmit satellite signals in which navigation messages and Coarse/Acquisition codes (C/A codes) are superimposed (carrier waves are modulated) on radio waves (L1 waves) of 1.57542 GHz which are carrier waves.

The C/A codes are codes used to identify the satellite signals of the GPS satellites 2 for which there are about thirty signals at present and have unique patterns formed from 1023 chip (period of 1 ms) in which each chip is one of +1 and −1. Accordingly, by using a correlation between the satellite signal and the pattern of each C/A code, it is possible to detect the C/A code superimposed on the satellite signal.

The satellite signal (specifically, a navigation message) transmitted by each GPS satellite 2 includes orbit information that indicates the position of each GPS satellite 2 on the orbiting path. An atomic clock is mounted on each GPS satellite 2 and the satellite signal includes considerably accurate time information measured by the atomic clock. Accordingly, by receiving the satellite signals from four or more GPS satellites 2 and performing positioning calculation using the orbit information and the time information included in each satellite signal, it is possible to obtain accurate information regarding the position and the time of a reception point (an installation location of the GPS antenna 50). Specifically, a 4-dimensional equation with four variables of time t and a 3-dimensional position (z, y, and z) of the reception point may be established in order to obtain its solution.

When the position of the reception point is known, satellite signals can be received from one or more GPS satellites 2 and time information regarding the reception point can be obtained using the time information included in each satellite signal.

Further, information regarding a difference between the time of each GPS satellite 2 and the time of the reception point can be obtained using the orbit information included in each satellite signal. A slight time error of the atomic clock mounted on each GPS satellite 2 is measured by a control segment on the earth and a time correction parameter used to correct the time error is also included in the satellite signal. Thus, by correcting the time of the reception point using the time correction parameter, it is possible to obtain the considerably accurate time information.

Figure 2A:
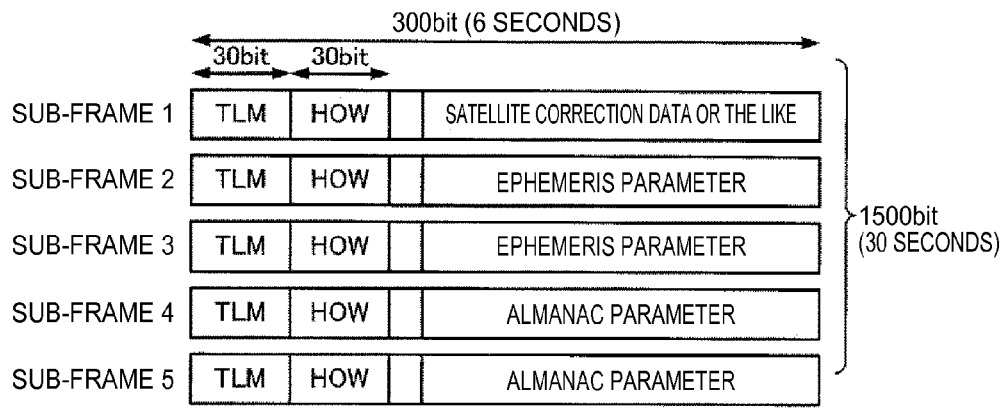
FIGS. 2A to 2C are diagrams illustrating the structures of navigation messages transmitted from GPS satellites.
Figure 2B:
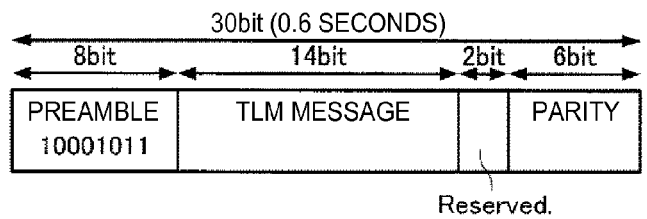
Figure 2C:
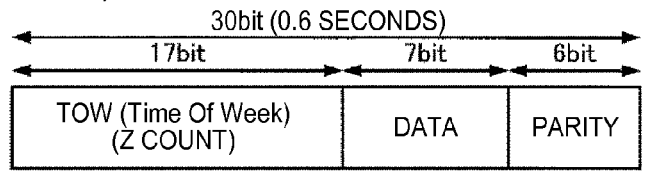

FIGS. 2A to 2C are diagrams illustrating the structures of navigation messages transmitted from GPS satellites.

As illustrated in FIG. 2A, the navigation message is structured as data in which a main frame with a total number of bits, 1500 bits, is one unit. The main frame is divided into five sub-frames 1 to 5, each of which has 300 bits. The data of one sub-frame is transmitted from each GPS satellite 2 for 6 seconds. Accordingly, the data of one main frame is transmitted from each GPS satellite 2 for 30 seconds.

The sub-frame 1 includes satellite correction data such as week number data (WN). The week number data is information that indicates a week including a time of the GPS satellite 2. The beginning point of the time of the GPS satellite 2 is 00:00:00 Jan. 6 1980 in the UTC (world standard time) and a week beginning on that day has week number 0. The week number data is updated on a weekly basis.

The sub-frames 2 and 3 each include an ephemeris parameter (detailed orbit information regarding each PGS satellite 2). The sub-frames 4 and 5 each include an almanac parameter (general orbit information regarding all of the GPS satellites 2).

The beginning of each of the sub-frames 1 to 5 includes a TLM (Telemetry) word in which 30-bit TLM (Telemetry word) data is stored and a HOW word in which 30-bit HOW (handover word) data is stored.

Accordingly, the TLM word and the HOW word are transmitted from the GPS satellite 2 at intervals of 6 seconds, whereas the satellite correction data such as the week number data, the ephemeris parameter, and the almanac parameter are transmitted at intervals of 30 seconds.

As illustrated in FIG. 2B, the TLM word includes preamble data, a TLM message, reserved bits, and parity data.

As illustrated in FIG. 2C, the HOW word includes time information such as TOW (Time of Week) (hereinafter also referred to as "Z count"). In Z count data, an elapsed time from 0 o'clock on every Sunday is expressed in units of seconds and returns to 0 at 0 o'clock of Sunday of the next week. That is, the z count data is information expressed at units of seconds from the beginning of the week every week and an elapsed time is a number expressed in units of 1.5 seconds. Here, the z count data indicates time information regarding a time at which the first bit of next sub-frame data is transmitted. For example, the z count data of the sub-frame 1 indicates time information regarding a time at which the first bit of the sub-frame 2 is transmitted. The HOW word also includes 3-bit data (ID code) indicating the ID of the sub-frame. That is, the HOW words of the sub-frames 1 to 5 illustrated in FIG. 2A include ID codes, "001," "010," "011," "100," and "101."

By acquiring the week number data included in the sub-frame 1 and the HOW words (the Z count data) included in the sub-frames 1 to 5, it is possible to calculate the time of the GPS satellite 2. When the week number data is acquired beforehand and an elapsed time from a time at which the week number data is acquired is counted internally, the current week number data of the GPS satellite 2 can be obtained despite the fact that the week number data is not acquired each time. Accordingly, when only the Z count data is acquired, the current time of the GPS satellite 2 can be known by a rough estimate.

The above-described satellite signals are received via the GPS antenna 50 illustrated in FIG. 1 by the GPS receiver 10.

The GPS antenna 50 is an antenna that receives various radio waves including the satellite signals and is connected to the GPS receiver 10.

The GPS receiver 10 (which is an example of a satellite signal reception unit) performs various processes based on the satellite signals received via the GPS antenna 50.

More specifically, the GPS receiver 10 has a normal positioning mode (which is an example of a first mode) and a fixed position mode (which is an example of a second mode) and is set to one of the normal positioning mode and the fixed position mode according to a control command (control command for mode setting) from the processing unit (CPU) 20.

In the normal positioning mode, the GPS receiver 10 functions as a "positioning calculation unit," receives the satellite signals transmitted from the plurality of GPS satellites 2 (preferably, 4 or more GPS satellites), and performs positioning calculation based on the orbit information (specifically, the ephemeris data, the almanac data, and the like described above) and the time information (specifically, the week number data, the Z count data, and the like described above) included in the received satellite signals.

In the fixed position mode, the GPS receiver 10 functions as a "timing signal generation unit," receives the satellite signal transmitted from at least one GPS satellite 2, and generates 1 PPS (1 Pulse Per Second) based on the orbit information and the time information included in the received satellite signal and the position information regarding the set reception point. The 1 PPS (which is an example of a timing signal synchronized with a criterion time) is a pulse signal completely synchronized with the UTC (world standard time) and includes one pulse at intervals of 1 second. Thus, the GPS receiver 10 can generate a timing signal accurately synchronized with a criterion time since the satellite signal used to generate the timing signal includes the orbit information and the time information.

Hereinafter, the configuration of the GPS receiver 10 will be described in detail.

Figure 3:
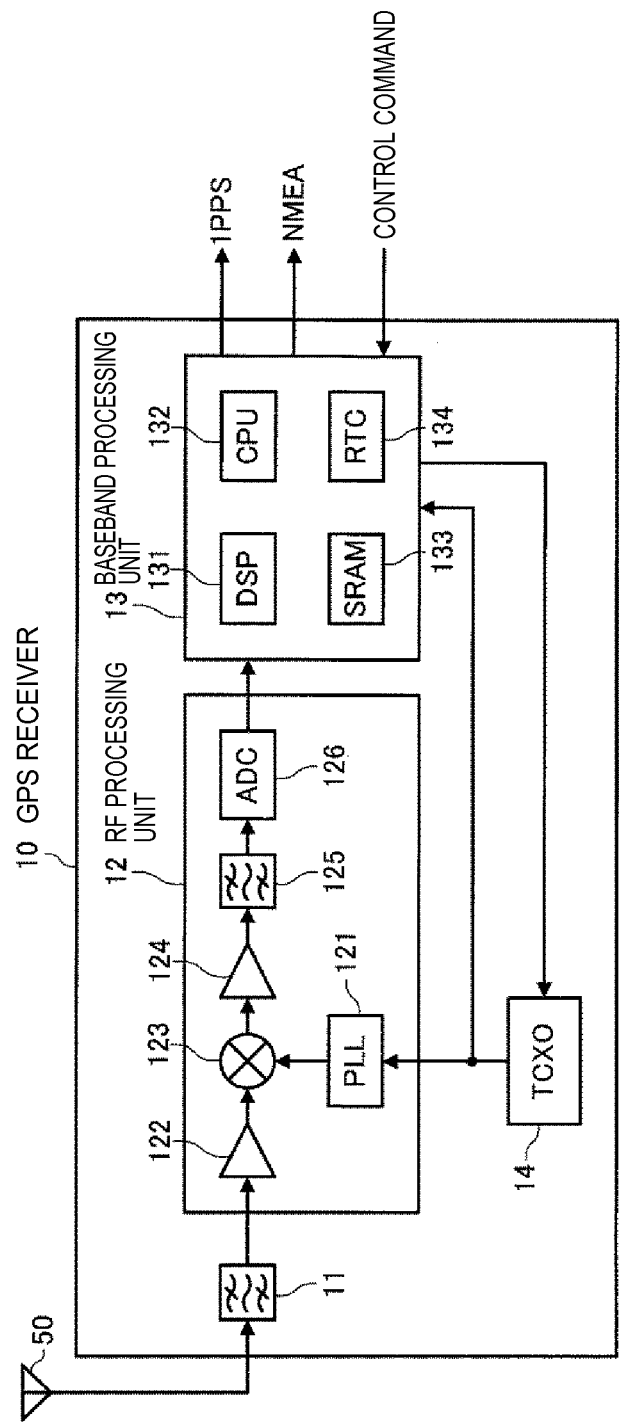
FIG. 3 is a block diagram illustrating an example of the configuration of a GPS receiver included in the timing signal generation device illustrated in FIG. 1.

FIG. 3 is a block diagram illustrating an example of the configuration of a GPS receiver included in the timing signal generation device illustrated in FIG. 1.

The GPS receiver 10 illustrated in FIG. 3 is configured to include a surface acoustic wave (SAW) filter 11, an RF processing unit 12, a baseband processing unit 13, and a temperature compensated crystal oscillator (TCXO) 14.

The SAW filter 11 performs a process of extracting the satellite signal from the radio waves received by the GPS antenna 50. The SAW filter 11 is configured as a bandpass filter that passes a signal of 1.5 GHz band.

The RF processing unit 12 is configured to include a phase locked loop (PLL) 121, a low noise amplifier (LNA) 122, a mixer 123, an IF amplifier 124, an intermediate frequency (IF) filter 125, and an A/D converter (ADC) 126.

The PLL 121 generates a clock signal obtained by multiplying an oscillation signal of the TCXO 14 oscillated at about tens of MHz by a frequency of the 1.5 GHz band.

The satellite signal extracted by the SAW filter 11 is amplified by the LNA 122. The satellite signal amplified by the LNA 122 is mixed with the clock signal output by the PLL 121 by the mixer 123 and is down-converted into a signal (IF signal) with an intermediate frequency band (for example, a few of MHz). The signal mixed by the mixer 123 is amplified by the IF amplifier 124.

Since a high-frequency signal of a GHz order is also generated along with the IF signal through the mixing of the mixer 123, the IF amplifier 124 also amplifies the high-frequency signal along with the IF signal. The IF filter 125 passes the IF signal and removes the high-frequency signal (accurately, attenuates the high-frequency signal to a level equal to or less than a predetermined level). The IF signal passing through the IF filter 125 is converted into a digital signal by the ADC (A/D converter) 126.

The baseband processing unit 13 is configured to include a digital signal processor (DSP) 131, a central processing unit (CPU) 132, a static random access memory (SRAM) 133, and a real time clock (RTC) 134 and performs various processes using the oscillation signal of the TCXO 14 as a clock signal.

The DSP 131 and the CPU 132 demodulate the baseband signal from the IF signal in cooperation with each other in order to acquire the orbit information or the time information included in the navigation message and to perform a process of the normal positioning mode or a process of the fixed position mode.

The SRAM 133 stores the acquired time information or orbit information, the position information regarding the reception point set according to a predetermined control command (a control command for position setting), an elevation angle mask or the like used for the fixed position mode, and the like. The RTC 134 generates a timing for performing baseband processing. The RTC 134 is counted up to a clock signal from the TCXO 14.

Specifically, the baseband processing unit 13 generates a local code with the same pattern as each C/A code and performs a process (satellite searching) of taking a correlation between each C/A code and the local code included in the baseband signal. The baseband processing unit 13 adjusts a generation timing of the local code so that a correlation value with respect to each local code is peak and determines that synchronization with the GPS satellite 2 using the local code as the C/A code is achieved (the GPS satellite 2 is captured) when the correlation value is equal to or greater than a threshold value. In the GPS, the Code Division Multiple Access (CDMA) scheme in which all of the GPS satellites 2 transmit satellite signals with the same frequency using different C/A codes is adopted. Accordingly, by determining the C/A code included in the received satellite signal, it is possible to search for the GPS satellite 2 which can be captured.

In order to acquire the orbit information or the time information regarding the captured GPS satellite 2, the baseband processing unit 13 performs a process of mixing the baseband signal and the local code with the same pattern as the C/A code of the GPS satellite 2. The navigation message including the orbit information or the time information regarding the captured GPS satellite 2 is demodulated to the mixed signal. The baseband processing unit 13 performs a process of acquiring the orbit information or the time information included in the navigation message and storing the orbit information or the time information in the SRAM 133.

The baseband processing unit 13 receives a predetermined control command (specifically, the control command for mode setting) and is set to one of the normal positioning mode and the fixed position mode. In the normal positioning mode, the baseband processing unit 13 performs the positioning calculation using the orbit information and the time information regarding four or more GPS satellites 2 stored in the SRAM 133.

In the fixed position mode, the baseband processing unit 13 outputs the 1 PPS with high accuracy using the orbit information regarding one or more GPS satellites 2 stored in the SRAM 133 and the position information regarding the reception point stored in the SRAM 133. Specifically, the baseband processing unit 13 includes a 1 PPS counter that counts a generation timing of each pulse of the 1 PPS in a part of the RTC 134, calculates a propagation delay time necessary for the satellite signal transmitted from the GPS satellite 2 to reach the reception point based on the orbit information regarding the GPS satellites 2 and the position information regarding the reception point, and changes a set value of the 1 PPS counter to a desired value based on the propagation delay time.

The baseband processing unit 13 may output the 1 PPS based on the time information regarding the reception point obtained through the positioning calculation in the normal positioning mode or may perform the positioning calculation in the fixed position mode when the plurality of GPS satellites 2 can be captured.

The baseband processing unit 13 outputs NMEA data including various kinds of information such as the position information or the time information regarding the positioning calculation result and a reception status (the number of captures of the GPS satellites 2, the intensity of the satellite signal, or the like).

The operation of the GPS receiver 10 having the above-described configuration is controlled by the processing unit (CPU) 20 illustrated in FIG. 1.

The processing unit 20 (which is an example of a satellite signal reception control device) transmits various control commands to the GPS receiver 10, controls the operation of the GPS receiver 10, receives the 1 PPS or the NMEA data output by the GPS receiver 10, and performs various processes. For example, the processing unit 20 may perform various processes according to programs stored in any memory.

The processing unit 20 is configured to include a phase comparator 21, a loop filter 22, a digital signal processor (DSP) 23, a divider 24, and a GPS control unit 25. The DSP 23 and the GPS control unit 25 may be configured as one component.

The DSP 23 (which is an example of a "position information generation unit") acquires the NMEA data from the GPS receiver 10 periodically (for example, at intervals of 1 second), collects the position information (the positioning calculation results by the GPS receiver 10 in the normal positioning mode) included in the NMEA data to generate statistical information at a predetermined time, and performs a process of generating the position information regarding the reception point based on the statistical information. In particular, when A is assumed to be a most frequent value of the plurality of positioning calculation results by the GPS receiver 10 in the normal positioning mode (hereinafter also simply referred to as a "most frequent value") or a median value (hereinafter also simply referred to as a "median value") and σ is assumed to be a standard deviation of the plurality of positioning calculation results, the DSP 23 generates the position information regarding the reception point based on a value present within a range of A±σ/4. Here, the DSP 23 forms a "selection unit" that selects a value used for the DSP 23 to generate the position information regarding the reception point within the foregoing range. The configuration including the GPS receiver 10 and the processing unit 20 forms a "timing signal generation device" that generates a timing signal. At least a part of the "selection unit" (a configuration having a function of selecting one value from the range of A±σ/4) may be provided inside or outside the processing unit 20 as a separate unit from the DSP 23.

The GPS control unit 25 (which is an example of a reception control unit) transmits various control commands to the GPS receiver 10 and controls an operation of the GPS receiver 10. Specifically, the GPS control unit 25 transmits the control command for mode setting to the GPS receiver 10 and performs a process of switching the mode of the GPS receiver 10 from the normal positioning mode to the fixed position mode. The GPS control unit 25 transmits the control command for position setting to the GPS receiver 10 before the switching of the mode of the GPS receiver 10 from the normal positioning mode to the fixed position mode and performs a process of setting the position information regarding the reception point generated by the DSP 23 in the GPS receiver 10.

The divider 24 performs f division on the clock signal (frequency: f) output by the atomic oscillator 30 and outputs a divided clock signal of 1 Hz.

The phase comparator 21 compares the phase of the 1 PPS output by the GPS receiver 10 to the phase of the divided clock signal of 1 Hz output by the divider 24. A phase difference signal of the comparison result of the phase comparator 21 is input to the atomic oscillator 30 via the loop filter 22. Parameters of the loop filter 22 are set by the DSP 23.

The divided clock signal of 1 Hz output by the divider 24 is synchronized with the 1 PPS output by the GPS receiver 10, and thus the timing signal generation device 1 outputs the divided clock signal as the 1 PPS with considerably high frequency accuracy synchronized with the UTC to the outside. The timing signal generation device 1 outputs the latest NMEA data to the outside in synchronization with the 1 PPS at the intervals of 1 second.

The atomic oscillator 30 is an oscillator capable of outputting a clock signal with high frequency accuracy using energy transfer of atoms. For example, an atomic oscillator using rubidium atoms or cesium atoms is widely known. For example, an atomic oscillator using the electromagnetically induced transparency (EIT) phenomenon (also called the coherent population trapping (CPT) phenomenon) or an atomic oscillator using the optical micro double resonance phenomenon can be used as the atomic oscillator 30. The timing signal generation device 1 also outputs a clock signal with a frequency of f output by the atomic oscillator 30 to the outside.

The atomic oscillator 30 is configured to adjust a frequency minutely according to an output voltage (control voltage) of the loop filter 22. As described above, the clock signal output by the atomic oscillator 30 is completely synchronized with the 1 PPS output by the GPS receiver 10 by the phase comparator 21, the loop filter 22, the DSP 23, and the divider 24. That is, the configuration formed by the phase comparator 21, the loop filter 22, the DSP 23, and the divider function as a "synchronization control unit" that synchronizes the clock signal output by the atomic oscillator 30 with the 1 PPS. Since the atomic oscillator 30 alone does not have a flat frequency temperature property, the temperature sensor 40 is placed near the atomic oscillator 30 and the DSP 23 also performs a process of temperature compensation of the frequency temperature property of the atomic oscillator 30 by adjusting an output voltage of the phase comparator 21 according to a detected value (detected temperature) of the temperature sensor 40.

For example, when a situation (hold over) in which the GPS receiver 10 may not receive the satellite signal occurs, the accuracy of the 1 PPS output by the GPS receiver 10 deteriorates or the GPS receiver 10 stops outputting the 1 PPS. In this case, the processing unit 20 may stop the process of synchronizing the clock signal output by the atomic oscillator 30 with the 1 PPS output by the GPS receiver 10 and may oscillate the atomic oscillator 30 at a free-running frequency. Thus, even when the accuracy of the 1 PPS output by the GPS receiver 10 deteriorates, the timing signal generation device 1 can output the 1 PPS with high frequency accuracy achieved through the oscillation of the atomic oscillator 30 at the free-running frequency. Even when a double oven or single oven controlled crystal oscillator (OCXO) is used instead of the atomic oscillator 30, the 1 PPS with high frequency accuracy achieved through the oscillation at the free-running frequency can be output.

Hereinafter, the normal positioning mode and the fixed position mode will be described in detail.

Figure 4:
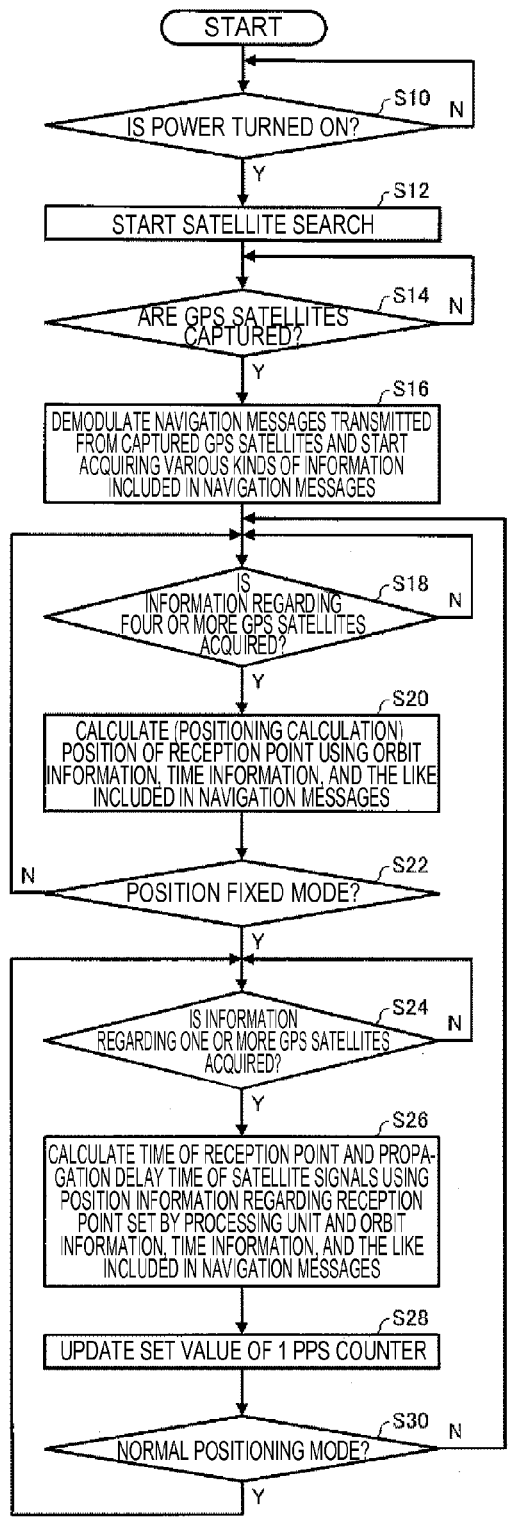
FIG. 4 is a flowchart illustrating an example of a processing order in a normal positioning mode and a fixed position mode in the GPS receiver illustrated in FIG. 3.

FIG. 4 is a flowchart illustrating an example of a processing order in the normal positioning mode and the fixed position mode in the GPS receiver illustrated in FIG. 3.

As illustrated in FIG. 4, when power is turned on (Y of S10), the baseband processing unit 13 is first initialized to the normal positioning mode, satellite search is started to search for the GPS satellites 2 which can be captured (S12), and it is determined whether the GPS satellites 2 are captured (S14).

Specifically, the baseband processing unit 13 demodulates the baseband signal from the IF signal generated from the received satellite signals by the RF processing unit 12, generates the local code with the same pattern with the C/A code of each satellite number, and calculates a correlation value between each local code and the C/A code included in the baseband signal. When the local code and the C/A code included in the baseband signal are the same code, the correlation value has a peak at a predetermined timing. However, when the local code and the C/A code are different codes, the correlation value has no peak and is normally approximately zero. The baseband processing unit 13 adjusts the generation timing of the local code so that the correlation value between the local code and the C/A code included in the baseband signal is maximized. When the correlation value is equal to or greater than a predetermined threshold value, it is determined that the GPS satellite 2 is captured. Then, the baseband processing unit stores information (a satellite number or the like) regarding each of the captured GPS satellites 2 in the SRAM 133.

When at least one GPS satellite 2 is captured, the baseband processing unit 13 demodulates the navigation messages transmitted from the captured GPS satellites 2 and starts acquiring various kinds of information included in the navigation messages (S16).

Specifically, the baseband processing unit 13 demodulates each of the navigation messages from the captured GPS satellites 2, acquires various kinds of information such as the time information and the orbit information, and stores the acquired information in the SRAM 133.

Next, the baseband processing unit 13 determines whether the information regarding four or more GPS satellites 2 is acquired (S18). When the information is acquired, the position of the reception point is calculated (positioning calculation is performed) using the orbit information, the time information, and the like included in the navigation messages (S20).

Specifically, the baseband processing unit 13 selects four or more GPS satellites 2 from all of the captured GPS satellites 2 and reads the orbit information and the time information regarding the selected GPS satellites 2 from the SRAM 133 to perform the positioning calculation. Then, the baseband processing unit 13 stores various kinds of information such as the positioning calculation result (the position information regarding the reception point) and a reception status in the SRAM 133.

The baseband processing unit 13 determines whether the mode is the fixed position mode (S22) and repeats the processes of steps S18 and S20 until the mode is changed to the fixed position mode.

When the mode is changed to the fixed position mode, the baseband processing unit 13 determines whether the information regarding one or more GPS satellites 2 is acquired (S24). When the information is acquired, the time of the reception point and the propagation delay time of the satellite signals are calculated using the position information regarding the reception point set by the processing unit 20 and the orbit information, the time information, and the like included in the navigation message (S26).

Specifically, the baseband processing unit 13 selects one or more GPS satellites 2 from all of the captured GPS satellites 2, reads the time information (Z count data or the like) regarding the selected GPS satellites 2 from the SRAM 133, and calculates the time (for example, a time of the beginning of a next sub-frame) of the reception point. The baseband processing unit 13 reads the orbit information regarding the selected GPS satellites 2 from the SRAM 133 and calculates the positions of the GPS satellites 2. The baseband processing unit 13 reads the position information regarding the reception point set by the processing unit 20 from the SRAM 133, calculates distances between the reception point and the GPS satellites 2 using the position information regarding the reception point and the calculation results of the positions of the GPS satellites 2, and calculates the propagation delay times of the satellite signals from the radio wave velocity.

Next, the baseband processing unit 13 updates the set value of the 1 PPS counter using the propagation delay times (the calculation results of step S26) of the satellite signals (S28).

Specifically, the 1 PPS counter is a counter that generates a pulse of the 1 PPS when the counter counts up to the set value. For example, the baseband processing unit 13 updates the set value of the 1 PPS counter so that the recent pulse of the 1 PPS is generated previously by the propagation delay time of the satellite signal with respect to a reception timing of the beginning of a next sub-frame.

Then, the baseband processing unit 13 determines whether the mode is the normal positioning mode (S30) and repeats the processes of steps S24 to S28 until the mode is changed to the normal positioning mode. When the mode is changed to the normal positioning mode, the process proceeds to step S18.

Figure 5:
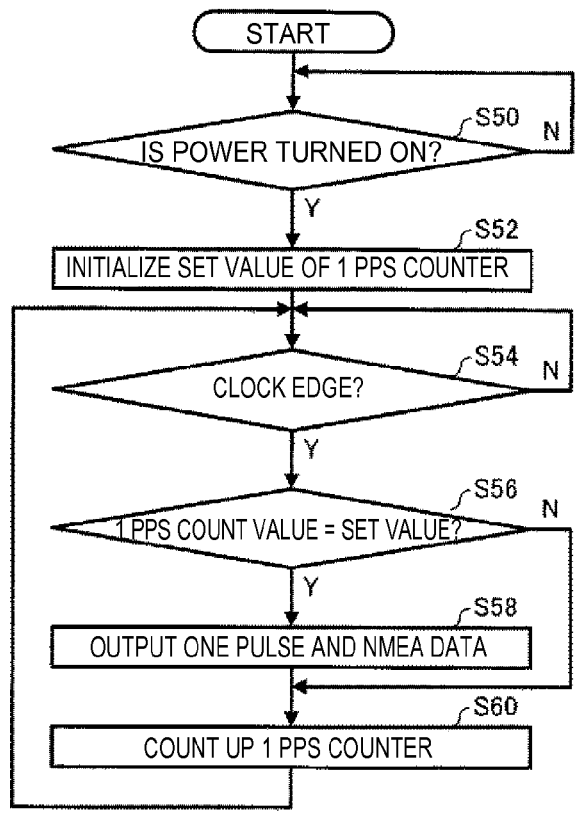
FIG. 5 is a flowchart illustrating an example of a processing order of 1 PPS output in the GPS receiver illustrated in FIG. 3.

FIG. 5 is a flowchart illustrating an example of a processing order of 1PPS output in the GPS receiver illustrated in FIG. 3.

As illustrated in FIG. 5, when power is turned on (Y of S50), the baseband processing unit 13 initializes the set value of the 1 PPS counter included in the RTC 134 (S52).

Next, the baseband processing unit 13 determines whether a timing is a timing of a clock edge of the 1 PPS counter (S54). At this timing, the baseband processing unit 13 determines whether the count value of the 1 PPS counter is identical to the set value (S56). When the count value is identical to the set value, one pulse and the NMEA data are output (S58).

Specifically, the baseband processing unit 13 reads various kinds of latest information stored in the SRAM 133 and converts the information into data with the NMEA format to output the data. The set values of the 1 PPS counter are sequentially updated in step S28 of FIG. 4 described above.

Then, the baseband processing unit 13 counts up the 1 PPS counter (S60). Thereafter, the process proceeds to step S54.

Conversely, when the count value of the 1 PPS counter is not identical to the set value at the timing of the clock edge of the 1 PPS counter, the baseband processing unit 13 does not perform the process of step S58 and the process proceeds to step S60. The baseband processing unit 13 counts up the 1 PPS counter (S60). Thereafter, the process proceeds to step S54.

Figure 6:
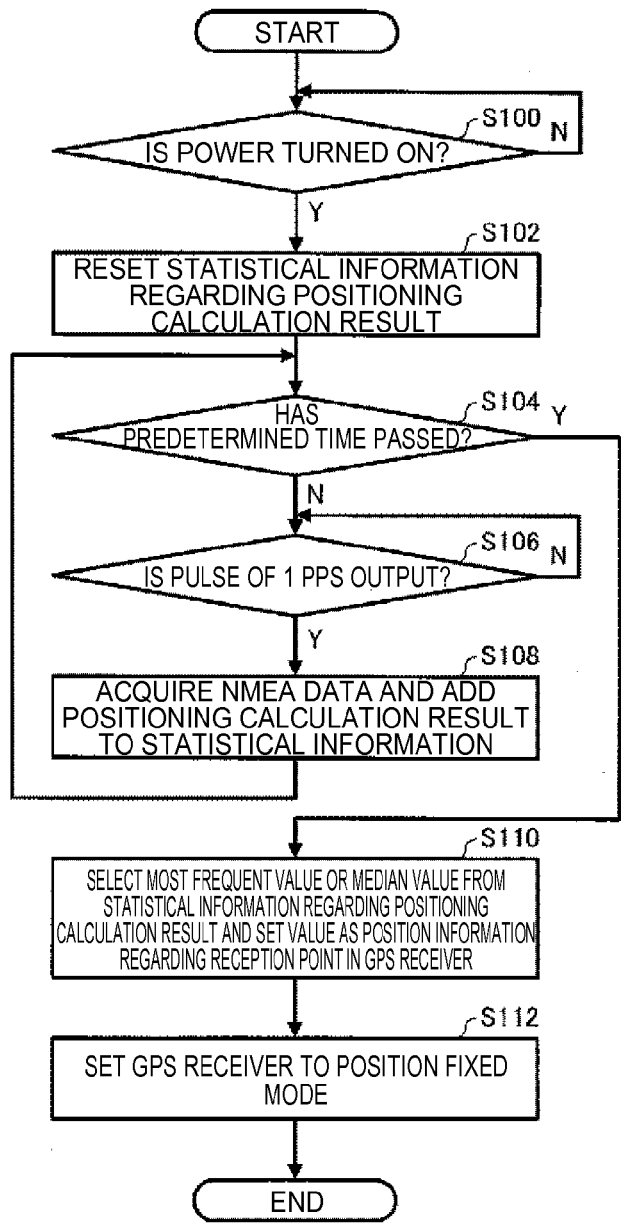
FIG. 6 is a flowchart illustrating an example of a processing order of control of the GPS receiver performed by a processing unit of the timing signal generation device illustrated in FIG. 1.

FIG. 6 is a flowchart illustrating an example of a processing order of control of the GPS receiver by a processing unit of the timing signal generation device illustrated in FIG. 1.

As illustrated in FIG. 6, when power is turned on (Y of S100), the processing unit 20 first resets the statistical information regarding the positioning calculation results (S102).

Next, the processing unit 20 determines whether a predetermined time has passed (S104). Until the predetermined time has passed, the processing unit 20 determines whether a timing is a timing of the pulse output of the 1 PPS of the GPS receiver 10 (S106). The NMEA data output by the GPS receiver 10 is acquired at each timing and the positioning calculation result in the normal positioning mode by the GPS receiver 10 is added to the statistical information (S108).

When the predetermined time has passed, the processing unit 20 selects a value present within the predetermined range (within the range of A±σ/4 described above) centering on the most frequent value or the median value from the statistical information regarding the positioning calculation result and sets the value as the position information regarding the reception point in the GPS receiver 10 (S110), and sets the GPS receiver 10 to the fixed position mode (S112).

As the predetermined time of step S108 is longer, the accuracy of the position information regarding the reception point is improved. Therefore, it is preferable to set the predetermined time of step S108 to, for example, about one day (24 hours).

An experiment was carried out using a GPS simulator and a GPS receiver (actual receiver) in order to clarify the advantageous effect obtained by setting the value present within the range of A±σ/4 as the position information regarding the reception point. In the experiment, simulation was performed by setting a reception position (latitude, longitude, and altitude), the number of captured satellites, and an intensity of a satellite signal in the GPS simulator, a signal output by the GPS simulator was input to the GPS receiver, the position information (latitude, longitude, and altitude) output by the GPS receiver in the normal positioning mode was acquired at intervals of 1 second, and the average value, the median value, the most frequent value, and distances between these values and a true position (the reception position set in the GPS simulator) were calculated.

FIG. 7A is a table illustrating a positioning calculation result when the number of captures of the GPS satellites is large but a reception intensity is low. FIG. 7B is a table illustrating a positioning calculation result when the number of captures of the GPS satellites is small and the reception intensity is low.

The positioning calculation results illustrated in FIG. 7A were obtained by performing the experiment under the conditions that the number of captures of the GPS satellites is 7 or 8, the intensity of the satellite signal is −145 dBm, and a positioning time is 17 hours. The conditions were set assuming a reception environment in which the number of GPS satellites sufficient for the positioning calculation is captured but the intensity of the satellite signal is small. On the other hand, the positioning calculation results illustrated in FIG. 7B were obtained by performing the experiment under the conditions that the number of captures of the GPS satellites is 3 to 5, the intensity of the satellite signal is −145 dBm, and a positioning time is 16 hours. The conditions were set assuming a reception environment in which the intensity of the satellite signal is weak and the number of GPS satellites sufficient for the positioning calculation is not captured.

Both of the positioning calculation results illustrated in FIGS. 7A and 7B were the most frequent value, the median value, and the average value in the order in which the distance to the true position is small. From these results, it could be understood that the accuracy of the 1 PPS was improved by selecting the most frequent value or the media value of the position obtained through the positioning calculation and setting the most frequent value or the median value as the position information regarding the reception point in the GPS receiver in the fixed position mode, compared to a case in which the average value was selected.

That is, when the reception environment of the satellite signal deteriorates, an error of the positioning calculation caused due to multi-paths or the like increases. Therefore, when the average value of the positioning results is set as the position information in the fixed position mode, a probability of the error increasing is higher. However, by setting the most frequent value or the median value, the influence of the positioning result having a large error is rarely received. Therefore, it is possible to improve the accuracy of the 1 PPS in the fixed position mode.

By calculating the position information to be set in the fixed position mode using the positioning results in the normal positioning mode, it is possible to also reduce cost without limitation on a reception location.

As described above, even when the reception environment deteriorates, it is possible to generate the accurate position information by generating the position information regarding the reception point using the most frequent value or the median value of the plurality of positioning calculation results, compared to a case in which the position information regarding the reception point is generated using the average value of the plurality of positioning calculation results. As a result, the accurate timing signal can be reliably generated without depending on the reception environment.

Here, the most frequency value or the median value of the plurality of positioning calculation results which is a value used at the time of the generation of the position information regarding the reception point may be set as the position information regarding the reception point without being changed. However, even when a value (a value within a predetermined proximity range centering on the most frequent value or the median value) close to the most frequent value or the median value is used, the accurate position information can be generated compared to the case in which the average value is used. Hereinafter, this viewpoint will be described.

Figure 9:
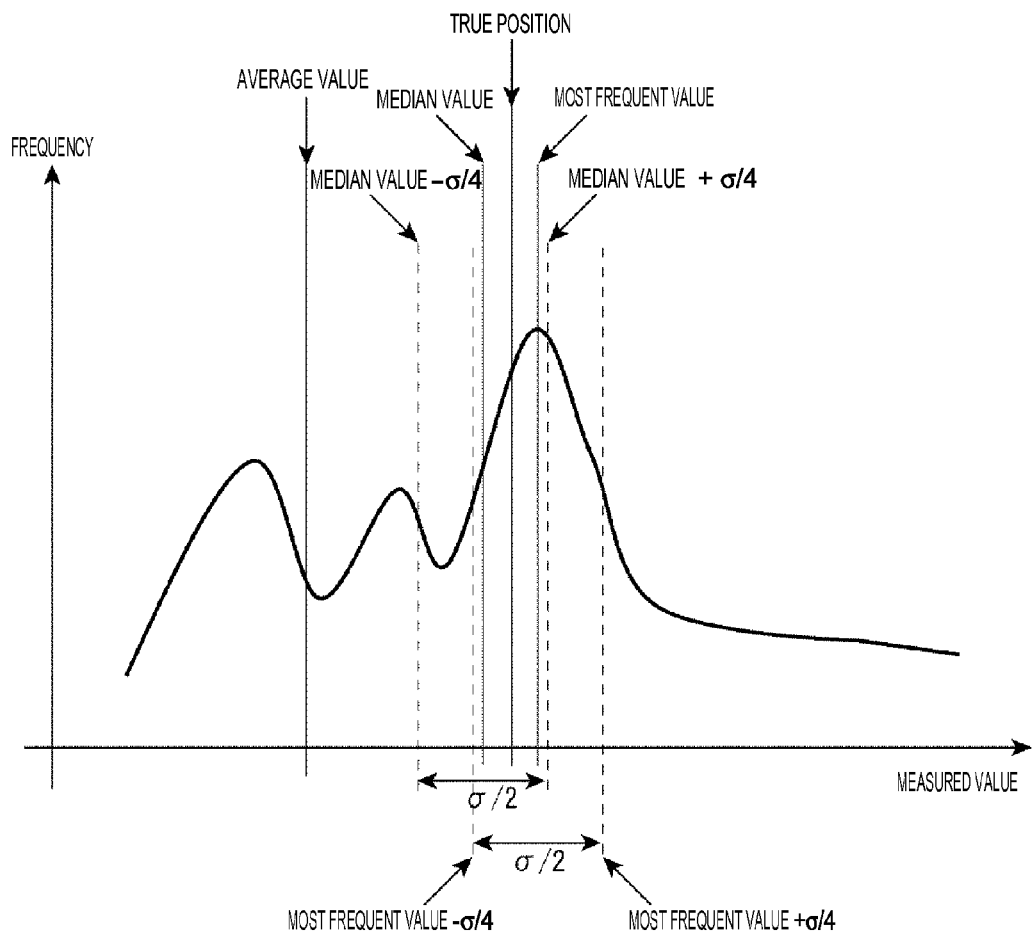
FIG. 9 is a graph for describing the relation between the average value and the standard deviation of the median value and the most frequent value of the positioning calculation results.

FIG. 8 is a table for describing a relation between an average value and a standard deviation of a median value and a most frequent value of positioning calculation results in the case illustrated in FIG. 7B. FIG. 9 is a graph for describing the relation between the average value and the standard deviation of the median value and the most frequent value of the positioning calculation results.

On the assumption that A is the most frequent value or the median value of the plurality of positioning calculation results and σ is a standard deviation of the plurality of positioning calculation results, a value present within the range of A±σ/4 is closer to the value of the true position (true value) further than the average value of the plurality of positioning calculation results, as illustrated in FIGS. 8 and 9.

From this fact, by generating the position information regarding the reception point based on the value present within the range of A±σ/4, it is possible to generate the timing signal which is rarely influenced by positioning results having a large error, as in irregular data such as multi-paths, and which is more accurate than in the related art in which the average value of the plurality of positioning calculation results is used to generate the position information regarding the reception point, even when the error of the positioning calculation increases due to deterioration in the reception environment.

Here, the positioning calculation results include information regarding the latitude, the longitude, and the altitude. Accordingly, as the most frequent value, there is included each of the most frequent value of the information regarding the latitude, the most frequent value of the information regarding the longitude, and the most frequent value of the information regarding the altitude. Likewise, as the median value, there is included each of the median value of the information regarding the latitude, the median value of the information regarding the longitude, and the median value of the information regarding the altitude. Further, as the standard deviation, there is included each of the standard deviation of the information regarding the latitude, the standard deviation of the information regarding the longitude, and the standard deviation of the information regarding the altitude. When the position information regarding the reception point is generated, a value present within the range of A±σ/4 may be used as each of the information regarding the latitude, the longitude, and the altitude of the plurality of positioning calculation results on the assumption that A is the most frequent value or the median value and σ is the standard deviation.

On the assumption that A is the most frequent value or the median value and σ is the standard deviation, the position information regarding the reception point may be generated in regard to some of the information regarding the latitude, the longitude, and the altitude of the plurality of positioning calculation results using the value present within the range of A±σ/4. In this case, information obtained by another unit may be used as the remaining information to generate the position information regarding the reception point. For example, the value present within the range of A±σ/4 may be used as the information regarding the latitude and the longitude and a known value or a value based on a detection result of an altimeter may be used as the information regarding the altitude.

As described above, the DSP 23 has the function of selecting the values used for the DSP 23 to generate the position information regarding the reception point in the range of A±σ/4. Thus, the DSP 23 can generate the position information regarding the reception point using the values present within the range of A±σ/4.

As methods in which the DSP 23 selects a value among the range of A±σ/4, although not particularly limited, following first method and second method can be exemplified.

In the first method, on the assumption that k is a coefficient, the DSP 23 (selection unit) selects a value which is the closest to k×A within the range of A±σ/4. Thus, the DSP 23 can generate the position information regarding the reception point using the value within the range of A±σ/4 in a relatively simple manner.

In the second method, on the assumption that B is an intermediate value between the most frequent value and the median value and k is a coefficient, the DSP 23 (selection unit) selects a value which is the closest to k×B within the range of A±σ/4. Thus, the DSP 23 can generate the position information regarding the reception point using the value within the range of A±σ/4 in a relatively simple manner.

Here, when k×A or k×B is within the range of A±σ/4, k×A or k×B may be used without being changed so that the DSP 23 generates the position information regarding the reception point. The positioning calculation results closest to k×A or k×B may be used so that the DSP 23 generates the position information regarding the reception point. When k×A or k×B is out of the range of A 35 σ/4, a value closest to k×A or k×B within the range of A±σ/4, that is, A+σ/4 or A−σ/4 may be used so that the DSP 23 generates the position information regarding the reception point. The positioning calculation results closest to A+σ/4 or A−σ/4 may be used so that the DSP 23 generates the position information regarding the reception point.

The DSP 23 can preferably adjust the above-described coefficient k. Thus, the values used for the DSP 23 to generate the position information regarding the reception point can be selected according to the reception environment. The adjustment may be automatically performed based on the positioning calculation results or may be manually performed through an operation unit (not illustrated) installed in the timing signal generation device 1.

When the adjustment is automatically performed based on the positioning calculation results, the DSP 23 adjusts the above-described coefficient k based on at least two values among the average value, the most frequent value, and the median value of the plurality of positioning calculation results of the GPS receiver 10. Thus, the value used for the DSP 23 to generate the position information regarding the reception point can be selected automatically using the positioning calculation results according to the reception environment. For example, a table in which a correspondence relation between the coefficient k and a difference between the most frequent value and the median value, a difference between the most frequent value and the average value, a difference between the median value and the average value, a ratio of the most frequent value to the median value, a ratio of the most frequent value to the average value, or a ratio of the median value to the average value is set is stored in advance in a memory (storage unit) (not illustrated), and then the coefficient k is adjusted using the table from the result of the difference between the most frequent value and the median value, the difference between the most frequent value and the average value, the difference between the median value and the average value, a ratio of the most frequent value to the median value, the ratio of the most frequent value to the average value, or the ratio of the median value to the average value.

The coefficient k is preferably within a range equal to or greater than 0.7 and equal to or less than 1.3. Thus, k×A or k×B can be prevented from being out of the range of A±σ/4. Therefore, the value used for the DSP 23 to generate the position information regarding the reception point can be selected with high accuracy according to the reception environment.

As described above, by generating the position information regarding the reception point using the value present within the range of A±σ/4, it is possible to generate the timing signal which is rarely influenced by positioning results having a large error and is more accurate than in the related art even when the error of the positioning calculation increases due to deterioration in the reception environment.

In the embodiment, by synchronizing the clock signal output by the atomic oscillator 30 with the accurate 1 PPS, it is possible to generate the clock signal with higher accuracy than the accuracy of the atomic oscillator 30. When the accuracy of the 1 PPS output by the GPS receiver 10 deteriorates or the GPS receiver 10 stops outputting the 1 PPS (that is, at the time of entry of holdover), at least the 1 PPS with the frequency accuracy of the atomic oscillator 30 can be output by stopping the process of synchronizing the clock signal output by the atomic oscillator 30 with the 1 PPS and oscillating the atomic oscillator 30 at the free-running frequency.

Since the 1 PPS output by the timing signal generation device 1 has considerably high accuracy, for example, the 1 PPS can be used as a clock input signal of a time server managing a time of a computer.

The atomic oscillator 30 has high long-term frequency stability. Accordingly, using the atomic oscillator 30 as the oscillator synchronizing with the timing signal, it is possible to generate a highly accurate timing signal even when a satellite signal may not be received for a long time.

Second Embodiment

Figure 10:
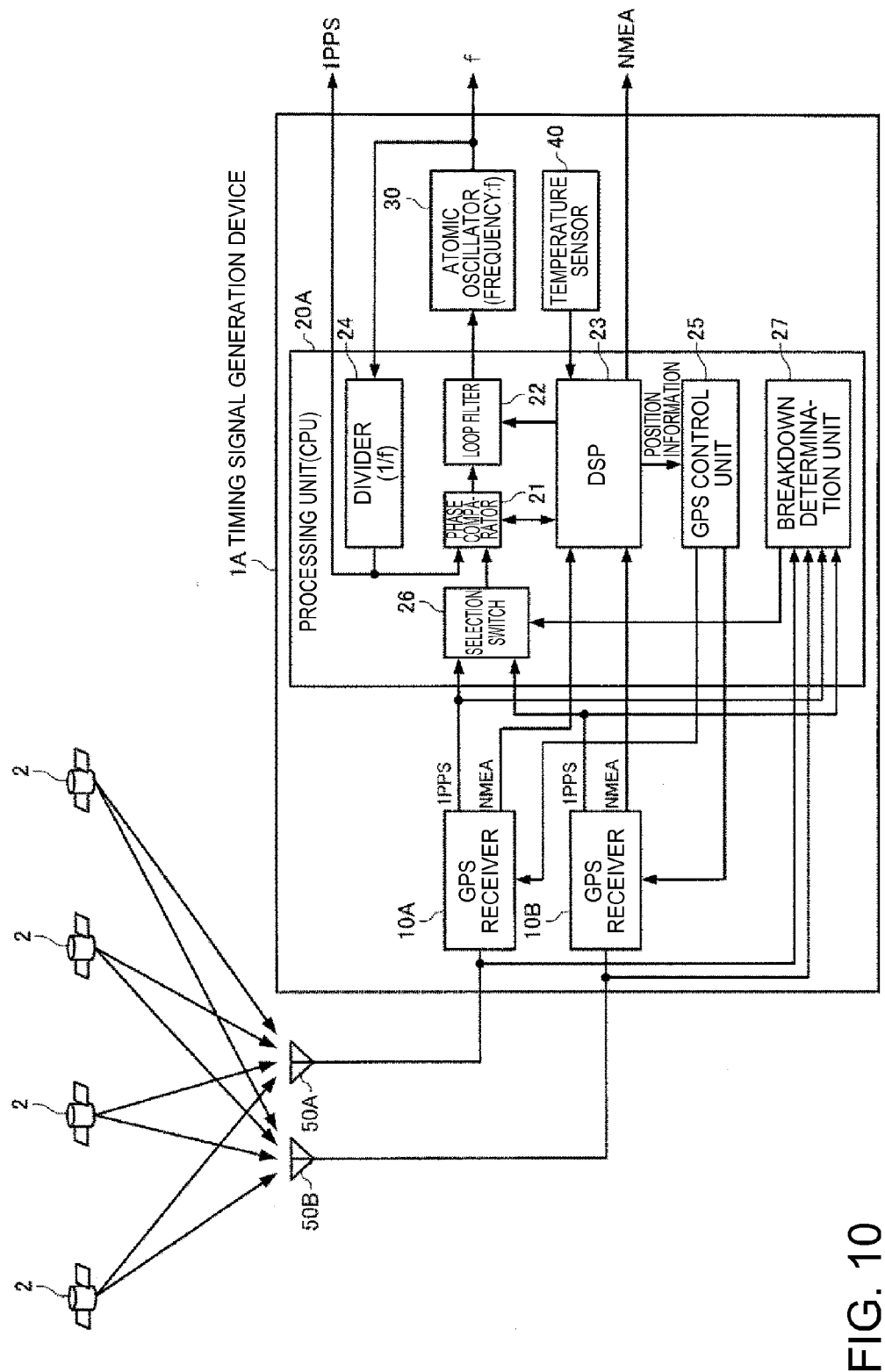
FIG. 10 is a diagram illustrating the overall configuration of a timing signal generation device according to a second embodiment of the invention.

FIG. 10 is a diagram illustrating the overall configuration of a timing signal generation device according to a second embodiment of the invention.

The embodiment is the same as the above-described first embodiment except that the number of GPS antennas and GPS receivers and the configuration of the processing unit differ.

In the following description, differences between the second embodiment and the above-described embodiment will be mainly described and the description of the same factors will be omitted. In FIG. 10, the same reference numerals are given to the same configurations as those of the above-described embodiment.

A timing signal generation device 1A illustrated in FIG. 10 is configured to include two GPS receivers 10A and 10B, a processing unit (CPU) 20A, an atomic oscillator 30, a temperature sensor 40, and two GPS antennas 50A and 50B.

As illustrated in FIG. 10, the GPS antenna 50A is connected to the GPS receiver 10A. The GPS receiver 10A receives a satellite signal transmitted from each GPS satellite 2 via the GPS antenna 50A and performs the same various processes as those of the GPS receiver 10 according to the above-described first embodiment.

Likewise, the GPS antenna 50B is connected to the GPS receiver 10B. The GPS receiver 10B receives a satellite signal transmitted from each GPS satellite 2 via the GPS antenna 50B and performs the same various processes as those of the GPS receiver 10 according to the above-described first embodiment.

Here, the two GPS antennas 50A and 50B are installed in the same location (accurately, almost the same location and therefore considered to be substantially the same). Accordingly, the two GPS receivers 10A and 10B output the same position information or almost (e.g., virtually or substantially) the same position information.

As in the processing unit 20 according to the first embodiment, the processing unit 20A is configured to include a phase comparator 21, a loop filter 22, a DSP 23, a divider 24, and a GPS control unit 25 and further include a selection switch 26 and a breakdown determination unit 27.

The breakdown determination unit 27 performs a process of determining whether each of a set of the GPS antenna 50A and the GPS receiver 10A and a set of the GPS antenna 50B and the GPS receiver 10B is broken down (e.g., malfunctioning). For example, the breakdown determination unit 27 can detect breakdown of the GPS antennas 50A and 50B by monitoring output currents of the GPS antennas 50A and 50B and can detect breakdown of the GPS receivers 10A and 10B by monitoring output signals (1 PPS or NMEA data) of the GPS receivers 10A and 10B.

The selection switch 26 selects and outputs one of the 1 PPS output by the GPS receiver 10A and the 1 PPS output by the GPS receiver 10B based on a determination result of the breakdown determination unit. The 1 PPS output by the selection switch 26 is input to the phase comparator 21.

The DSP 23 acquires the NMEA data periodically (for example, at intervals of 1 second) from each of the GPS receivers 10A and 10B, collects the position information (the positioning calculation results by the GPS receivers 10A and 10B in the normal positioning mode) included in each piece of NMEA data to generate two pieces of statistical information at a predetermined time, and performs a process of generating the position information regarding two reception points based on average values, most frequent values, or median values of the positioning calculation results.

The GPS control unit 25 transmits various control commands to the GPS receivers 10A and 10B and controls operations of the GPS receivers 10A and 10B. Specifically, the GPS control unit 25 transmits control commands for mode setting to the GPS receivers 10A and 10B and performs a process of switching the modes of the GPS receivers 10A and 10B from the normal positioning mode to the fixed position mode. The GPS control unit 25 transmits the control commands for position setting to the GPS receivers 10A and 10B before the switching of the mode of the GPS receivers 10A and 10B from the normal positioning mode to the fixed position mode and performs a process of setting the position information regarding the two reception points generated by the DSP 23 in the GPS receivers 10A and 10B.

Figure 11:
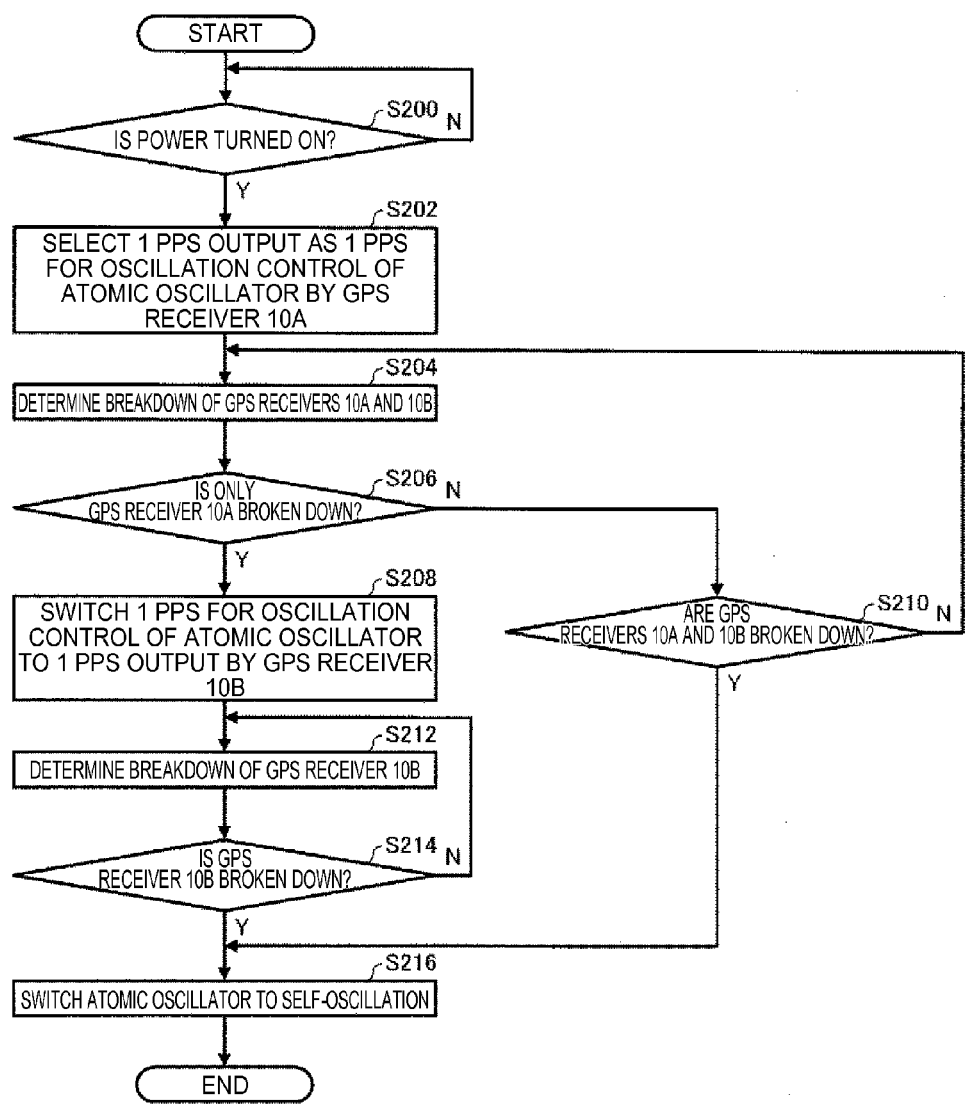
FIG. 11 is a flowchart illustrating an example of a processing order of 1 PPS selection in GPS receivers included in the timing signal generation device illustrated in FIG. 10.

FIG. 11 is a flowchart illustrating an example of a processing order of 1PPS selection in the GPS receivers included in the timing signal generation device illustrated in FIG. 10.

As illustrated in FIG. 11, when power is turned on (Y of S200), the processing unit 20A first selects the 1 PPS output as the 1 PPS (the 1 PPS input to the phase comparator 21) for oscillation control of the atomic oscillator 30 by the GPS receiver 10A (S202).

Next, the processing unit 20A determines breakdown of the GPS receivers 10A and 10B (S204) and determines whether only the GPS receiver 10A is broken down (S206).

When it is determined in step S206 that only the GPS receiver 10A is broken down, the 1 PPS for oscillation control of the atomic oscillator 30 is switched to the 1 PPS output by the GPS receiver 10B (S208). Thereafter, the processing unit 20A determines breakdown of the GPS receiver 10B (S212).

Then, the processing unit 20A determines whether the GPS receiver 10B is broken down (S214). When the GPS receiver 10B is not broken down, the process proceeds to step S212 and steps S212 and S214 are repeated until the GPS receiver 10B is broken down. Conversely, when the GPS receiver 10B is broken down, the atomic oscillator 30 is switched to oscillation at the free-running frequency (S216).

When the processing unit 20A determines in step S206 cases other than a case in which only the GPS receiver 10A is broken down, the processing unit 20A determines whether both of the GPS receives 10A and 10B are broken down (S210). In cases other than a case in which both of the GPS receivers 10A and 10B are broken down, the process proceeds to step S214, and steps S204, S206, and S210 are repeated until both of the GPS receivers 10A and 10B are broken down. Conversely, when both of the GPS receivers 10A and 10B are broken down, the atomic oscillator 30 is switched to oscillation at the free-running frequency (S216).

When one or both of the GPS receivers 10A and 10B are broken down, the processing unit 20A may output a breakdown notification signal to the outside to report the breakdown. For example, when information according to the breakdown notification signal is displayed on an external monitor, a user can recognize the breakdown and exchange a broken component.

In this way, the timing signal generation device 1A according to the second embodiment causes the GPS receiver 10B to operate in a similar manner to the GPS receiver 10A. When the GPS antenna 50A or the GPS receiver 10A is broken down, the 1 PPS to be input to the phase comparator 21 is quickly switched from the 1 PPS output by the GPS receiver 10A to the 1 PPS output by the GPS receiver 10B. In the embodiment, two sets of GPS receivers and GPS antennas are used, but three or more sets of GPS receivers and GPS antennas may also be used.

As described above, the timing signal generation device 1A according to the second embodiment includes the plurality of GPS antennas 50A and 50B installed in the same location and the plurality of GPS receivers 10A and 10B that process the satellite signals received by the GPS antennas 50A and 50B, detects the breakdown of the set of currently selected GPS receiver and GPS antenna, and switches to the other set of GPS antennas and GPS receiver. Accordingly, even when the set of currently selected GPS antenna and GPS receiver is broken down, the 1 PPS with high accuracy can be continuously output.

Further, the timing signal generation device 1A according to the second embodiment has the same advantageous effects as those of the timing signal generation device 1 according to the above-described first embodiment.

Third Embodiment

Figure 12:
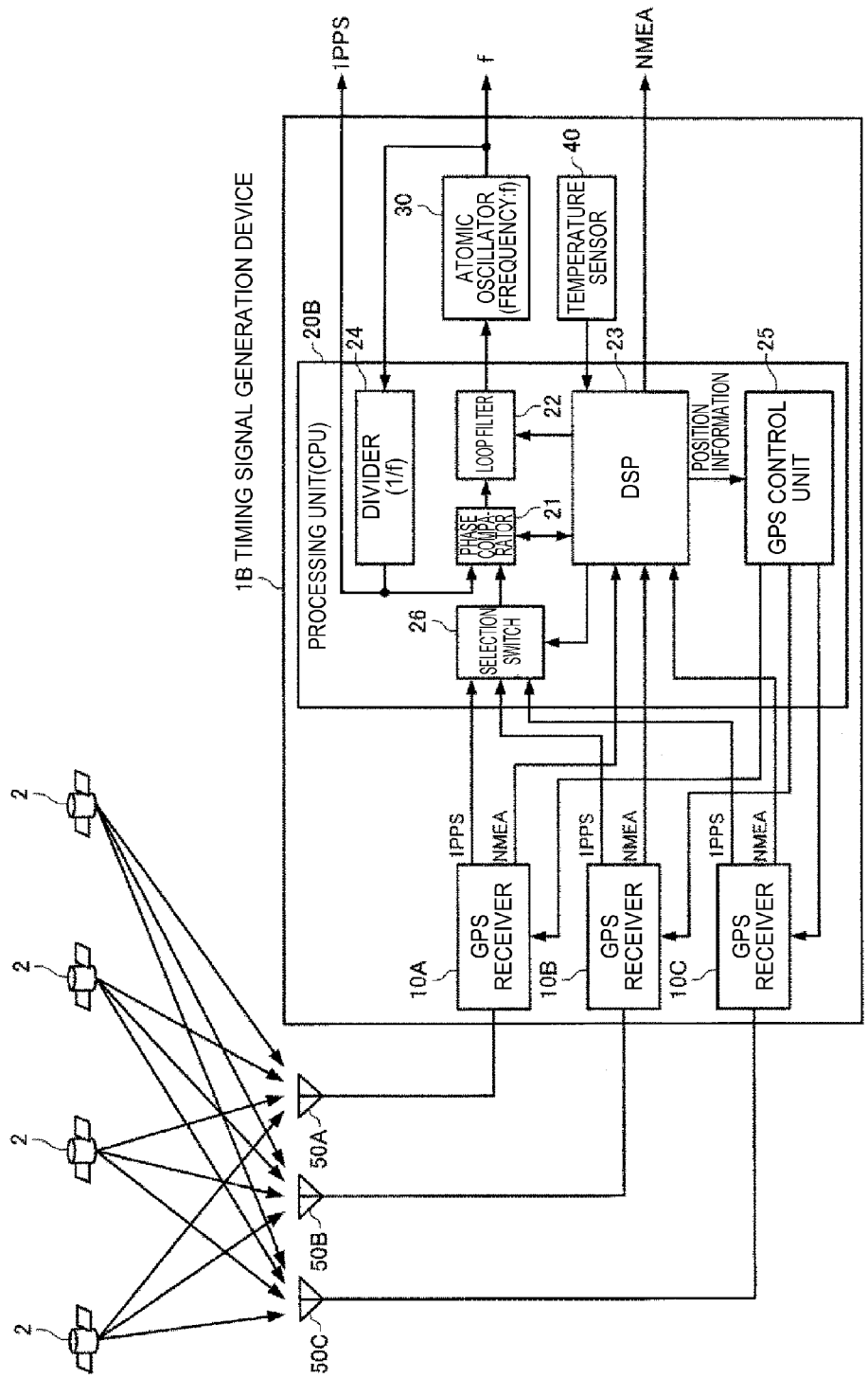
FIG. 12 is a diagram illustrating the overall configuration of a timing signal generation device according to a third embodiment of the invention.

FIG. 12 is a diagram illustrating the overall configuration of a timing signal generation device according to a third embodiment of the invention.

The embodiment is the same as the above-described first embodiment except that the number of GPS antennas and GPS receivers and the configuration of the processing unit differ.

In the following description, differences between the third embodiment and the above-described embodiments will be mainly described and the description of the same factors will be omitted. In FIG. 11, the same reference numerals are given to the same configurations as those of the above-described embodiments.

A timing signal generation device 1B illustrated in FIG. 12 is configured to include three GPS receivers 10A, 10B, and 10C, a processing unit (CPU) 20B, an atomic oscillator 30, a temperature sensor 40, and three GPS antennas 50A, 50B, and 50C.

As illustrated in FIG. 12, the GPS antenna 50A is connected to the GPS receiver 10A. The GPS receiver 10A receives a satellite signal transmitted from each GPS satellite 2 via the GPS antenna 50A and performs the same various processes as those of the GPS receiver 10 according to the above-described first embodiment.

Likewise, the GPS antenna 50B is connected to the GPS receiver 10B. The GPS receiver 10B receives a satellite signal transmitted from each GPS satellite 2 via the GPS antenna 50B and performs the same various processes as those of the GPS receiver 10 according to the above-described first embodiment.

Likewise, the GPS antenna 50C is connected to the GPS receiver 10C. The GPS receiver 10C receives a satellite signal transmitted from each GPS satellite 2 via the GPS antenna 50C and performs the same various processes as those of the GPS receiver 10 according to the above-described first embodiment.

In the embodiment, unlike the second embodiment, the three GPS antennas 50A, 50B, and 50C are installed in mutually different locations. Accordingly, the three GPS receivers 10A, 10B, and 10C output mutually different pieces of position information. For example, when the three GPS antennas 50A, 50B, and 50C are installed on the north side, the south side, and the east side of a building, respectively, reception situations of the satellite signals differ and the antenna capable of receiving the satellite signal most easily is changed according to a period of time. Accordingly, an order of superior and inferior accuracy of the 1 PPS output by the GPS receivers 10A, 10B, and 10C also changes over time.

As in the first embodiment, the processing unit 20B is configured to include a phase comparator 21, a loop filter 22, a DSP 23, a divider 24, and a GPS control unit 25 and further include a selection switch 26.

The DSP 23 acquires the NMEA data periodically (for example, at intervals of 1 second) from each of the GPS receivers 10A, 10B, and 10C, collects the position information (the positioning calculation results by the GPS receivers 10A, 10B, and 10C in the normal positioning mode) included in each piece of NMEA data to generate three pieces of statistical information at a predetermined time, and performs a process of generating the position information regarding three reception points based on most frequent values or median values of the positioning calculation results.

The DSP 23 compares the accuracy (synchronization accuracy with 1 second of UTC (world standard time)) of the 1 PPS output by the GPS receivers 10A, 10B, and 10C to each other based on predetermined parameter information (for example, the number of captured GPS satellites and the reception intensity of the satellite signal) included in the NMEA data acquired from each of the GPS receivers 10A, 10B, and 10C. For example, when the number of captured GPS satellites is the same, the DSP 23 can determine that the accuracy of the 1 PPS is higher as the reception intensity of the satellite signal is larger. When the reception intensity is the same, it can be determined that the accuracy of the 1 PPS is higher as the number of captured GPS satellites is larger.

The selection switch 26 selects and outputs one of the 1 PPS output by the GPS receiver 10A, the 1 PPS output by the GPS receiver 10B, and the 1 PPS output by the GPS receiver 10C according to a comparison result of the DSP 23. The 1 PPS output by the selection switch 26 is input to the phase comparator 21.

In the embodiment, after the DSP 23 controls the selection switch 26 so that the 1 PPS is selected, the DSP 23 monitors the NMEA data output by the GPS receiver outputting the selected 1 PPS. When a difference from a previous value is greater than a threshold value, the process of comparing the accuracy of the 1 PPS output by the GPS receivers 10A, 10B, and 10C to each other is performed again.

The GPS control unit 25 transmits various control commands to the GPS receivers 10A, 10B, and 10C and controls operations of the GPS receivers 10A, 10B, and 10C. In the embodiment, the GPS control unit 25 transmits control commands for mode setting to the GPS receivers 10A, 10B, and 10C and performs a process of switching the modes of the GPS receivers 10A, 10B, and 10C from the normal positioning mode to the fixed position mode. The GPS control unit 25 transmits the control commands for position setting to the GPS receivers 10A, 10B, and 10C before the switching of the mode of the GPS receivers 10A, 10B, and 10C from the normal positioning mode to the fixed position mode and performs a process of setting the position information regarding the three reception points generated by the DSP 23 in the GPS receivers 10A, 10B, and 10C.

Figure 13:
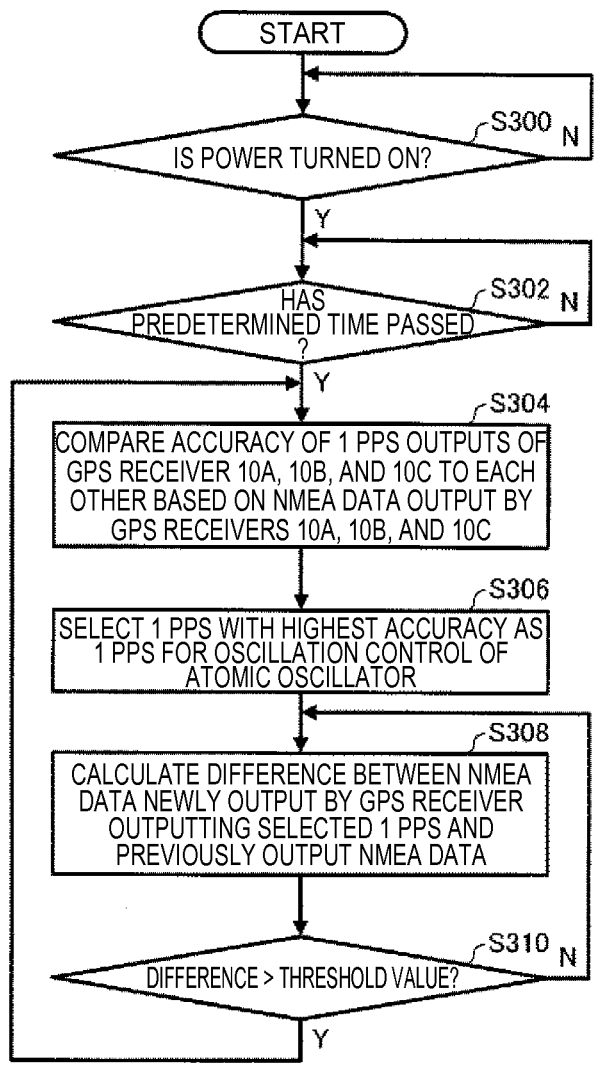
FIG. 13 is a flowchart illustrating an example of a processing order of 1 PPS selection in GPS receivers included in the timing signal generation device illustrated in FIG. 12.

FIG. 13 is a flowchart illustrating an example of a processing order of 1PPS selection in the GPS receivers included in the timing signal generation device illustrated in FIG. 12.

As illustrated in FIG. 12, when power is turned on (Y of S300), the processing unit 20B determines whether a predetermined time has passed until the predetermined time passes (S302). When the predetermined time has passed, the processing unit 20B first compares the accuracy of the 1 PPS output by the GPS receivers 10A, 10B, and 10C to each other based on the NMEA data output by each of the GPS receivers 10A, 10B, and 10C (S304).

Next, the processing unit 20B selects the 1 PPS with the highest accuracy as the 1 PPS (the 1 PPS to be input to the phase comparator 21) for oscillation control of the atomic oscillator 30 (S306).

Next, the processing unit 20B calculates a difference between the NMEA data newly output by the GPS receiver outputting the selected 1 PPS and the previous NMEA data (S308).

Then, the processing unit 20B determines whether the difference calculated in step S308 is greater than a threshold value (S310). When the difference is equal to or less than the threshold value, the process proceeds to step S308 and the process of step S308 and the determination of step S310 are repeated until the difference is greater than the threshold value. Conversely, when the difference is greater than the threshold value, the process proceeds to step S304 and the processes subsequent to the above-described step S304 are performed again.

In this way, the timing signal generation device 1B according to the third embodiment causes the three GPS receivers 10A, 10B, and 10C respectively connected to the three GPS antennas 50A, 50B, and 50C installed in the mutually different locations to operate in the similar manner and selects the 1 PPS with the highest accuracy as the 1 PPS to be input to the phase comparator 21. When it is determined that the accuracy of the currently selected 1 PPS deteriorates, the 1 PPS with the highest accuracy is selected again. In the embodiment, the number of sets of GPS receivers and GPS antennas is three, but may be two or four or more.

As described above, the timing signal generation device 1B according to the third embodiment includes the plurality of GPS antennas 50A, 50B, and 50C installed in the mutually different locations and the plurality of GPS receivers 10A, 10B, and 10C that process the satellite signals received by the GPS antennas 50A, 50B, and 50C and selects and outputs the 1 PPS with the highest accuracy among the plurality of 1 PPS output by the plurality of GPS receivers. Accordingly, even when the reception intensity, the number of visible satellites, and the reception environment such as multi-paths are changed over time, the 1 PPS with the high accuracy can be continuously output.

Further, the timing signal generation device 1B according to the third embodiment has the same advantageous effects as those of the timing signal generation device 1 according to the above-described first embodiment.

Fourth Embodiment

Figure 14:
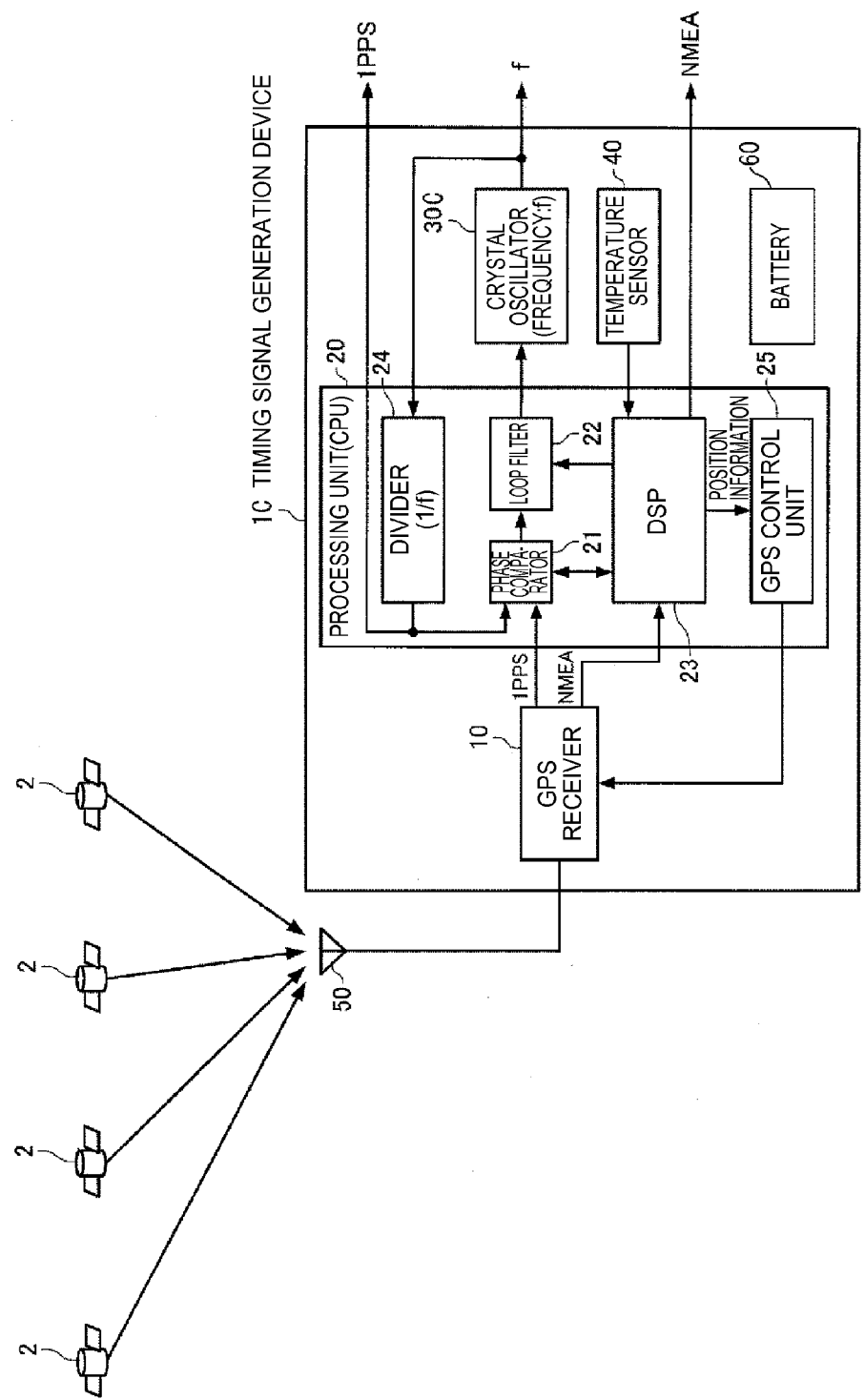
FIG. 14 is a diagram illustrating the overall configuration of a timing signal generation device according to a fourth embodiment of the invention.

FIG. 14 is a diagram illustrating the overall configuration of a timing signal generation device according to a fourth embodiment of the invention.

The embodiment is the same as the above-described first embodiment except that a crystal oscillator is included instead of the atomic oscillator and a battery is mounted.

In the following description, differences between the fourth embodiment and the above-described embodiment will be mainly described and the description of the same factors will be omitted. In the drawing, the same reference numerals are given to the same configurations as those of the above-described embodiment.

The illustrated timing signal generation device 1C includes a crystal oscillator 30C and a battery 60.

The crystal oscillator 30C is configured to minutely adjust a frequency according to an output voltage (control voltage) of the loop filter 22. A clock signal output by the crystal oscillator 30C is completely synchronized with the 1 PPS output by the GPS receiver 10 by the phase comparator 21, the loop filter 22, the DSP 23, and the divider 24.

The crystal oscillator 30C has a small size and consumes low power. Accordingly, by using the crystal oscillator 30C as an oscillator synchronized with a timing signal, it is possible to realize miniaturization and low power consumption of the timing signal generation device 1C. By using a controlled crystal oscillator as the crystal oscillator 30C, it is possible to generate a highly accurate timing signal even when a satellite signal may not be received for a long time. The atomic oscillator 30 according to the above-described first embodiment may be used instead of the crystal oscillator 30C.

The battery 60 supplies power to each unit of the timing signal generation device 1C. Thus, by supplying the power from the battery 60, it is possible to drive each unit of the timing signal generation device 1C. Therefore, even in a location where there is no external power source, the timing signal generation device 1C can be installed.

2. Electronic Apparatus

Next, an electronic apparatus according to an embodiment of the invention will be described.

Figure 15:
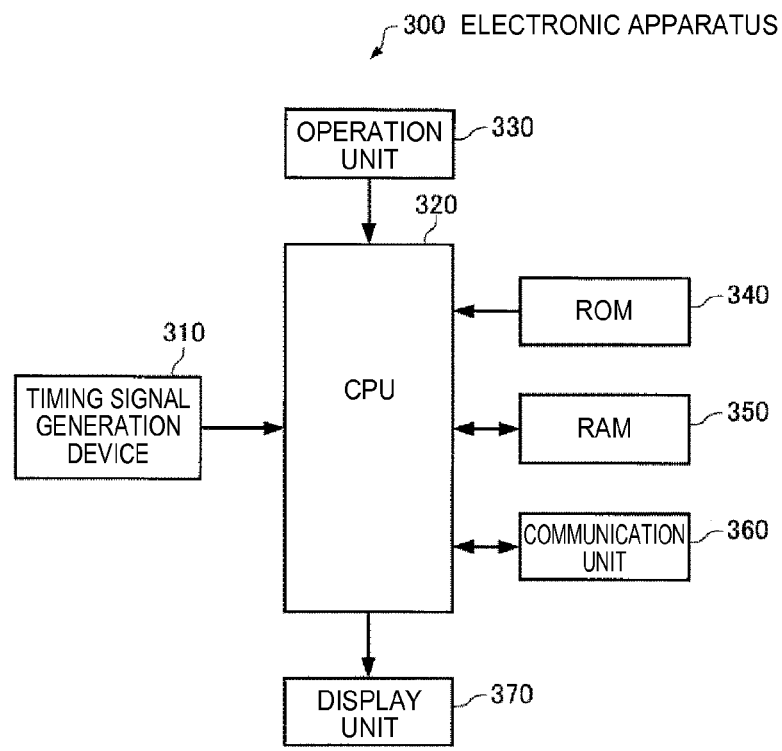
FIG. 15 is a block diagram illustrating an electronic apparatus according to an embodiment of the invention.

FIG. 15 is a block diagram illustrating the electronic apparatus according to the embodiment of the invention.

An electronic apparatus 300 illustrated in FIG. 15 is configured to include a timing signal generation device 310, a central processing unit (CPU) 320, an operation unit 330, a read-only memory (ROM) 340, a random access memory (RAM) 350, a communication unit 360, and a display unit 370.

For example, the timing signal generation device 310 is any one of the timing signal generation devices (1, 1A, 1B, and 1C) according to the above-described first to fourth embodiments. As described above, the timing signal generation device 310 receives satellite signals, generates a highly accurate timing signal (1PPS), and outputs the timing signal to the outside. Thus, it is possible to realize the electronic apparatus 300 with high reliability at low cost.

The CPU 320 performs various calculation processes or control processes according to programs stored in the ROM 340 or the like. Specifically, the CPU 320 performs a timing process, various processes according to operation signals from the operation unit 330, a process of controlling the communication unit 360 to perform data communication with the outside, a process of transmitting a display signal to display various kinds of information on the display unit 370, and the like in synchronization with the timing signal (1 PPS) or the clock signal output by the timing signal generation device 310.

The operation unit 330 is an input device configured to include an operation key or a button switch and outputs an operation signal according to a user's operation to the CPU 320.

The ROM 340 stores programs, data, and the like used for the CPU 320 to perform various calculation process or control processes.

The RAM 350 is used as a work region of the CPU 320 and temporarily stores programs or data read from the ROM 340, data input from the operation unit 330, calculation results executed by the CPU 320 according to various programs, and the like.

The communication unit 360 performs various kinds of control to establish data communication between the CPU 320 and an external device.

The display unit 370 is a display device configured to include a liquid crystal display (LCD) and display various kinds of information based on display signals input from the CPU 320. The display unit 370 may include a touch panel functioning as the operation unit 330.

Various electronic apparatuses can be considered as such an electronic apparatus 300, but the invention is not particularly limited. Examples of the electronic apparatus include a server (time server) for time management realizing synchronization with a standard time, a time management apparatus (time stamp server) that issues a time stamp, and a frequency criterion apparatus such as a base station.

3. Moving Object

Figure 16:
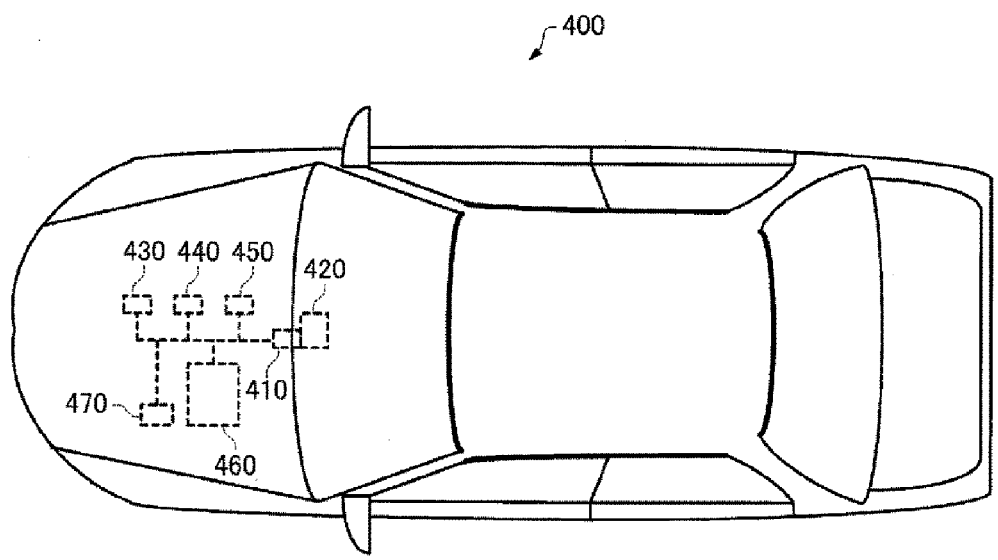
FIG. 16 is a diagram illustrating a moving object according to an embodiment of the invention.

FIG. 16 is a diagram illustrating a moving object according to an embodiment of the invention.

A moving object 400 illustrated in FIG. 16 is configured to include a timing signal generation device 410, a car navigation device 420, controllers 430, 440, and 450, a battery 460, and a backup battery 470.

The timing signal generation device 1 according to each of the above-described embodiments can be applied as the timing signal generation device 410. For example, while the moving object 400 is moving, the timing signal generation device 410 performs positioning calculation in real time in the normal positioning mode and outputs the 1 PPS, the clock signal, and the NMEA data. For example, when the moving object 400 is stopping, the timing signal generation device 410 performs positioning calculation in the normal positioning mode a plurality of times. Thereafter, the timing signal generation device 410 sets the most frequent value or the median value of a plurality of positioning calculation results as current position information and outputs the 1 PPS, the clock signal, and the NMEA data in the fixed position mode.

The car navigation device 420 displays a position, a time, or other various kinds of information on a display using the NMEA data output by the timing signal generation device 410 in synchronization with the 1 PPS or the clock signal output by the timing signal generation device 410.

The controllers 430, 440, and 450 perform various kinds of control on an engine system, a brake system, a keyless entry system, and the like. The controllers 430, 440, and 450 may perform various kinds of control in synchronization with the clock signal output by the timing signal generation device 410.

The moving object 400 according to the embodiment includes the timing signal generation device 410, and thus can ensure high reliability even during movement or stop.

Various moving objects can be considered as such a moving object 400. Examples of the moving object include automobiles (including electric automobiles), airplanes such as jet planes and helicopters, ships, rockets, and satellites.

The position information generation device, the timing signal generation device, the electronic apparatus, and the moving object according to the invention have been described according to the illustrated embodiments, but the invention is not limited thereto.

In the invention, replacement with any configuration having the same functions as those of the above-described embodiments can be made and any configuration may be added.

In the invention, the configurations of the above-described embodiments may be appropriately combined.

For example, in the timing signal generation device according to the above-described third embodiment, a backup set may be provided for each set of GPS antenna and GPS receiver, as in the second embodiment.

In the above-described embodiments, the timing signal generation devices using the GPS have been exemplified. However, Global Navigation Satellite Systems (GNSSs), for example, the Galileo and GLONASS other than the GPS may be used.

This Application claims priority to U.S. application Ser. No. 14/153,463 filed Jan. 13, 2014, which claims priority to JP 2014-054798 filed Mar. 18, 2014 and JP 2013-006994 filed Jan. 18, 2013. The entire disclosure of U.S. application Ser. No. 14/153,463 filed Jan. 13, 2014 and Japanese Patent Application Nos. JP 2014-054798 filed Mar. 18, 2014 and 2013-006994 filed Jan. 18, 2013 are expressly incorporated by reference herein.

What is claimed is:

1. A timing signal generation device comprising:
a receiver configured to
receive satellite signals from position information satellites, and
calculate a position of a reception point multiple times based on the satellite signals; and
a processor configured to
receive the calculated positions of the reception point from the receiver,
generate an actual position of the reception point based on a value within a range of $A\pm\sigma/4$, wherein A is a most frequent value or a median value of the calculated positions of the reception point received from the receiver and $\sigma$ is a standard deviation of the calculated positions of the reception point, and
output the position of the reception point to the receiver,
wherein the receiver is further configured to generate a timing signal based on (i) a satellite signal received from at least one position information satellite of the position information satellites and (ii) the actual position of the reception point received from the processor.

2. The timing signal generation device according to claim 1, wherein
the processor is configured to select a value which is the closest to $k\times A$ within the range of $A\pm\sigma/4$, and
k is a coefficient.

3. The timing signal generation device according to claim 2, wherein
the processor is configured to select a value which is the closest to $k\times B$ within the range of $A\pm\sigma/4$,
B is an intermediate value between the most frequent value and the median value, and
k is a coefficient.

4. The timing signal generation device according to claim 2, wherein the processor is configured to adjust the coefficient k.

5. The timing signal generation device according to claim 4, wherein the processor is configured to adjust the coefficient k based on at least two values among the most frequent value, the median value, and an average value of the calculated positions.

6. The timing signal generation device according to claim 2, wherein the coefficient k is within a range equal to or greater than 0.7 and equal to or less than 1.3.

7. The timing signal generation device according to claim 1, further comprising:
an oscillator that outputs a clock signal based on a control voltage;
a divider that performs frequency division on the clock signal to output a frequency divided clock signal;
a phase comparator that compares a phase of the timing signal with the frequency divided clock to signal to output a phase difference signal; and
a loop filter configured to output the control voltage based on the phase difference signal to synchronize the clock signal with the timing signal.

8. The timing signal generation device according to claim 7, wherein the oscillator is a crystal oscillator.

9. The timing signal generation device according to claim 7, wherein the oscillator is an atomic oscillator.

10. The timing signal generation device according to claim 1, further comprising a battery.

11. The timing signal generation device according to claim 1, wherein the processor is further configured to:
send a command to the receiver to set an operation mode of the receiver to one of a first mode and a second mode; and
output the position of the reception point before the processor sends the command to set the receiver to the second mode,
wherein the receiver is further configured to (i) calculate the positions when the operation mode is set to first mode and (ii) generate the timing signal based on the actual position of the reception point when the operation mode is set to the second mode.

* * * * *